United States Patent
Karlquist

(10) Patent No.: US 7,106,227 B2
(45) Date of Patent: Sep. 12, 2006

(54) METHOD AND APPARATUS FOR SYNCHRONIZING A MULTIPLE-STAGE MULTIPLEXER

(75) Inventor: Richard K. Karlquist, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 1025 days.

(21) Appl. No.: 09/967,390

(22) Filed: Sep. 28, 2001

(65) Prior Publication Data

US 2003/0063626 A1    Apr. 3, 2003

(51) Int. Cl.
*H03M 9/00*    (2006.01)

(52) U.S. Cl. ...................... 341/101; 714/707

(58) Field of Classification Search ............... 341/101, 341/144; 370/513, 536; 365/201; 714/743, 714/707
See application file for complete search history.

(56) References Cited

U.S. PATENT DOCUMENTS

| | | | | |
|---|---|---|---|---|
| 4,276,642 A * | 6/1981 | Siglow et al. | ............... | 370/513 |
| 5,182,467 A | 1/1993 | Taylor et al. | | |
| 5,265,102 A * | 11/1993 | Saito | ......................... | 714/743 |
| 5,608,343 A | 3/1997 | Ojima et al. | | |
| 5,619,509 A * | 4/1997 | Maruyama et al. | ......... | 714/707 |
| 5,726,990 A * | 3/1998 | Shimada et al. | ............ | 370/536 |
| 5,856,753 A | 1/1999 | Xu et al. | | |
| 5,969,655 A * | 10/1999 | Imai | .......................... | 341/144 |
| 6,201,829 B1 | 3/2001 | Schneider | | |
| 6,442,085 B1 * | 8/2002 | Fragano et al. | ............ | 365/201 |

FOREIGN PATENT DOCUMENTS

| | | |
|---|---|---|
| EP | 0 435 311 | 12/1990 |
| EP | 0 493 001 | 12/1991 |
| EP | 0 759 664 | 2/1997 |

OTHER PUBLICATIONS

European Search Report dated Mar. 14, 2005.
Cheryl L. Stout—"10-Gb/s Silicon Bipolar 8 : 1 Multiplexer and 1 : 8 Demultiplexer", IEEE Journal Of Solid-State Circuits, Mar. 28, 1993, No. 3, New York, U.S. A., vol. 8, pp. 339-343.

* cited by examiner

*Primary Examiner*—Jean Bruner Jeanglaude

(57) ABSTRACT

A method and apparatus for synchronizing multiple-stage multiplexers are disclosed. According to exemplary embodiments of the present invention, multiplexer circuits in the multiple-stage multiplexer are synchronized based upon a frequency response of the output of the multiplexer. The power level of the output of the multiple-stage multiplexer is measured at a frequency corresponding to the input data rate of the multiple-stage multiplexer, during the time a test pattern is sent through the multiple-stage multiplexer. In an exemplary embodiment of the invention, the multiple-stage multiplexer is placed in substantially random states until the measured power level reaches the predetermined.

41 Claims, 20 Drawing Sheets

METHOD AND APPARATUS FOR SYNCHRONIZING A MULTIPLE-STAGE MULTIPLEXER

BACKGROUND OF THE INVENTION

1. Technical Field of the Invention

The present invention relates to synchronizing multiplexers, and particularly to a method and apparatus for synchronizing multiple-stage multiplexers.

2. Description of Related Art

A multiplexer is a device that combines multiple streams of data into a single, higher speed stream of data. Some multiplexers can be viewed as parallel-to-serial converters. An N:1 multiplexer, shown in FIG. 1, receives N streams of input data at a data rate R and generates a stream of data at data rate N*R. A simplified block diagram of the N:1 multiplexer is illustrated in FIG. 2. An input register stores a bit value from each input data stream in parallel. A selector switch is connected between the output of each bit from the input register and the output of the N:1 multiplexer. An N-state counter cycles through N different counter states. The output of the counter drives a control input of the selector switch. In this way, the selector switch sequentially connects the output of the N:1 multiplexer to the output of each bit from the input register. For exemplary purposes only, the order of connection to the multiplexer output is from the top bit of the input register to the bottom bit thereof, as shown in FIG. 2. The carry output of the N-state counter drives the clock input of the input register. For an input data rate R, the clock frequency of the N-state counter is N*R and the clock frequency of the input register is R.

For reasons of practicality, multiplexers are typically implemented using smaller sized multiplexer circuits. FIG. 3 is a block diagram of an implementation of a multiple-stage multiplexer. The multiple-stage multiplexer employs, in a first stage, N M:1 multiplexer circuits or sub-multiplexers that operate in parallel at input data rate R. In a second stage, a single N:1 multiplexer circuit receives the output of each M:1 multiplexer circuit at input data rate M*R. The output of the N:1 multiplexer circuit has a data rate of M*N*R.

In the multiple-stage multiplexer illustrated in FIG. 3, the multiplexer circuits in the first stage must be synchronized with each other so that the data generated by the multiple-stage multiplexer is in a predictable order. The multiplexer circuits in the first stage are synchronized when the N-state counters therein are all in the same state. FIG. 4 illustrates the multiple-stage multiplexer generating the correct ordering of output bits when the multiplexer circuits are synchronized with each other. In contrast, FIG. 5 illustrates the multiple-stage multiplexer when a multiplexer circuit in the first stage thereof is not synchronized with the other multiplexer circuits.

When power is first applied to a multiple-stage multiplexer, the internal (N-state) counters initially assume random states. Consequently, the multiplexer circuits in the first stage of a multiple-stage multiplexer will not be initially synchronized with each other. A conventional approach for synchronizing the internal counters in a multiple-stage multiplexer implements the internal counters with reset capability so that the internal counters may be reset simultaneously with a single reset signal This conventional synchronization approach, however, requires that the reset signal have relatively precise timing for each internal counter in order to comport with necessary set-up and hold times relative to the clock signal applied to the internal counters. In instances in which the multiplexer circuits in the first stage are implemented in more than one integrated circuit chip, the conventional synchronization approach becomes less effective as speeds increase.

Another prior synchronization approach places the multiplexer circuits of a multiple-stage multiplexer in random states until the carry output signals generated by the internal counters occur at the same time. The multiplexer circuits may be placed in random states by, for example, connecting the reset input of each multiplexer circuit to a pseudo-random pulse generator, as shown in FIG. 6. By resetting the multiplexer circuits at pseudo-random times, the multiplexer circuits are effectively placed in pseudo-random states. Alternatively, the multiplexer circuits may be placed in random states by temporarily powering down each multiplexer circuit at the same time. Circuit breaker type circuits may be utilized to temporarily power down the multiplexer circuits, as shown in FIG. 7. A shortcoming with this prior synchronization approach, however, is that the carry output signals generated by the multiplexer circuits are substantially slower relative to the frequency of the clock input of the internal counters. The carry output signals thus lack the timing precision necessary to accurately determine whether the carry output signals are generated during the same period of the internal counter clock.

Other prior synchronization techniques utilize built-in-test-equipment (BITE) for applying test patterns to the multiple-stage multiplexer and monitoring the value of each bit in the output generated by the multiple-stage multiplexer. As the output data rate of the multiple-stage multiplexers increases, more sophisticated BITE must be utilized in order to monitor the bit values generated by the multiple-stage multiplexers. Sophisticated BITE is undesirable because it is expensive.

Based upon the foregoing, there is a need for synchronizing multiplexers in a relatively accurate and inexpensive manner.

SUMMARY OF THE INVENTION

The present invention overcomes shortcomings in prior synchronization techniques and satisfies a significant need for a method and apparatus for synchronizing multiple-stage multiplexers. According to exemplary embodiments of the present invention, multiplexer circuits in the multiple-stage multiplexer are synchronized or made to appear to be synchronized based upon a frequency response of the output of the multiplexer. A spectral component of the multiplexer output, such as the output power level of the multiple-stage multiplexer, is monitored at a frequency corresponding to the input data rate of the multiple-stage multiplexer. A test pattern is sent through the multiple-stage multiplexer during the time the output power level is monitored.

In an exemplary embodiment of the present invention, multiplexer circuits forming the multiple-stage multiplexer are individually placed in different states in successive fashion until the power level of the output of the multiple-stage multiplexer at the frequency of the input data rate is minimized or otherwise falls below a predetermined level. The multiple-stage multiplexer is synchronized when the power level is minimized.

In another exemplary embodiment of the present invention, a test pattern is applied to the data inputs of the multiplexer circuits forming the multiple-stage multiplexer. The timing and ordering of bits of the test pattern applied to multiplexer circuits are changed until the power level of the output of the multiple-stage multiplexer reaches a minimum.

The particular timing and ordering of the test pattern bits that produce the minimum power level are maintained for use by the multiple-stage multiplexer during normal (i.e., non-test) operation. In this way, the data input to the multiple-stage multiplexer is modified to compensate for the multiple-stage multiplexer being out of synch.

By monitoring the power level of the output signal of the multiple-stage multiplexer, embodiments of the present invention can relatively efficiently cause the multiple-stage multiplexer to operate as a synchronized multiple-stage multiplexer without having to perform computations at the output data rate of the multiple-stage multiplexer.

Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

A more complete understanding of the method and apparatus of the invention may be obtained by reference to the following Detailed Description when taken in conjunction with the accompanying Drawings wherein.

DETAILED DESCRIPTION OF THE EXEMPLARY EMBODIMENTS OF THE INVENTION

Figure 1:
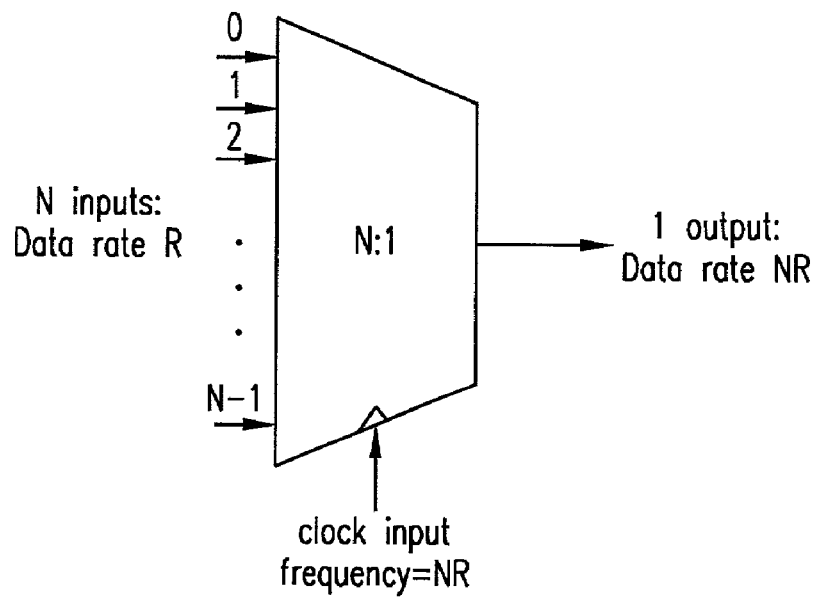
FIG. 1 is a diagram of a conventional multiplexer.
Figure 2:
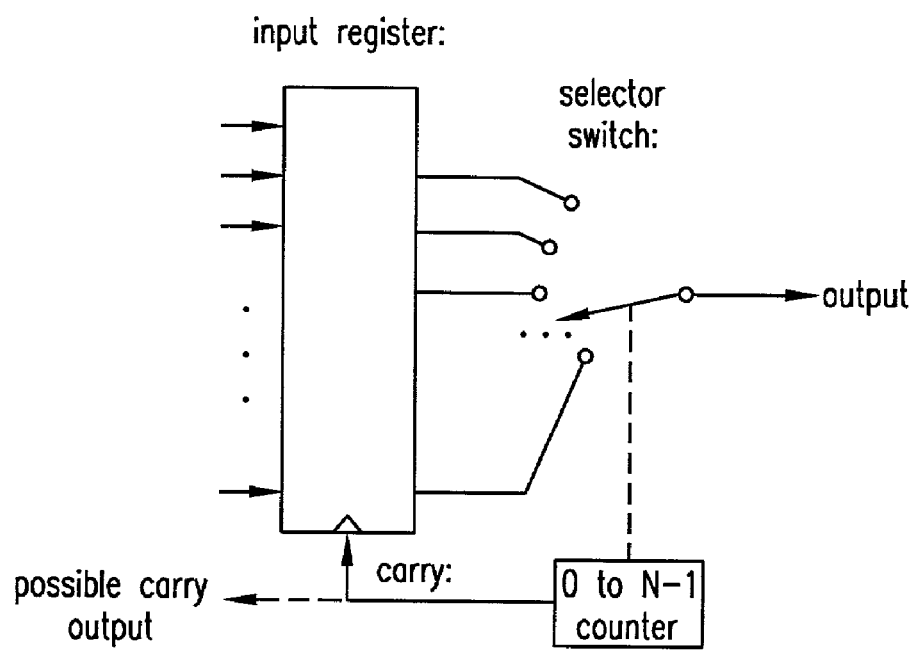
FIG. 2 is a block diagram of the conventional multiplexer of FIG. 1.
Figure 3:
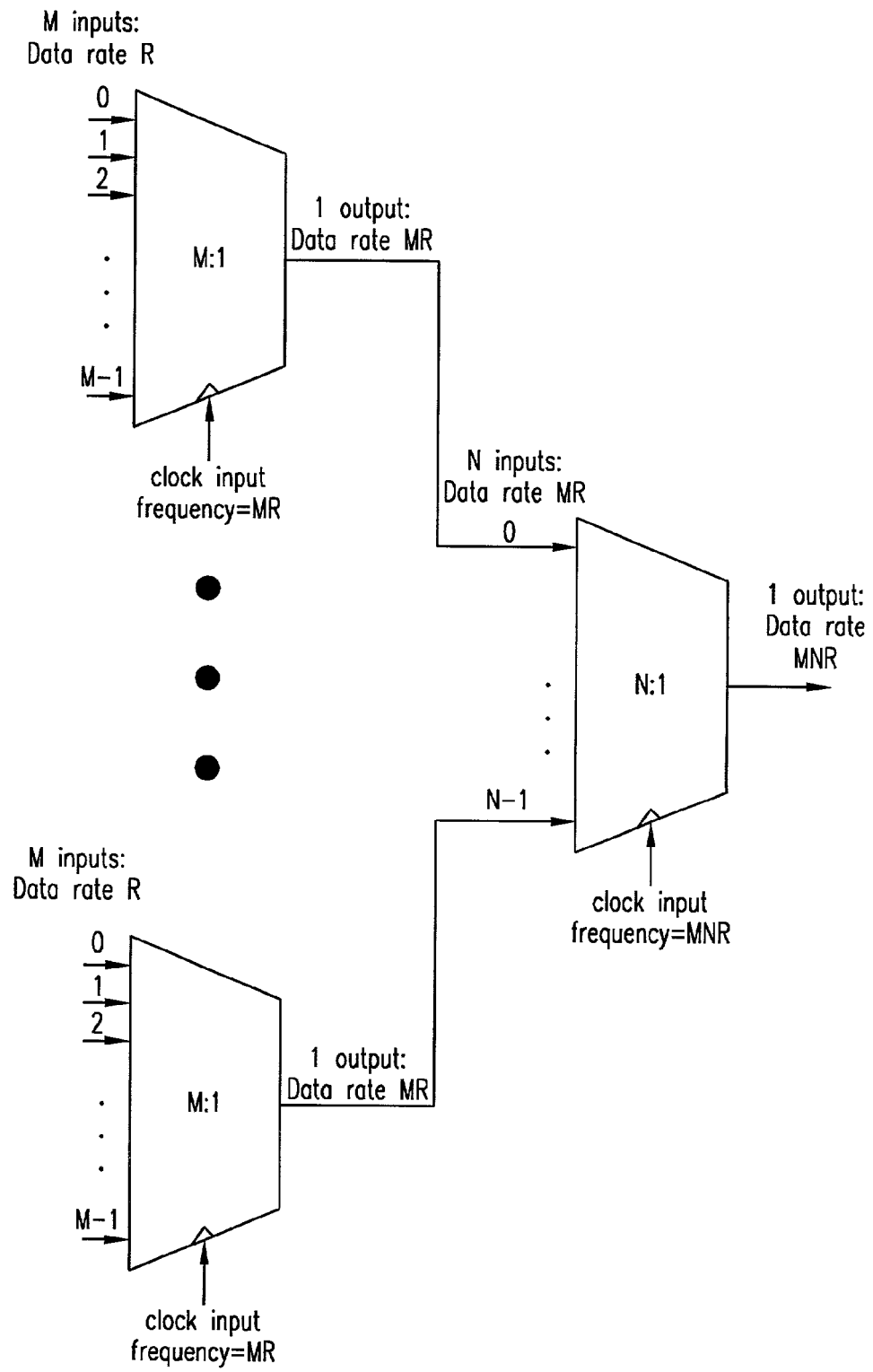
FIG. 3 is a block diagram of a conventional multiple-stage multiplexer.
Figure 4:
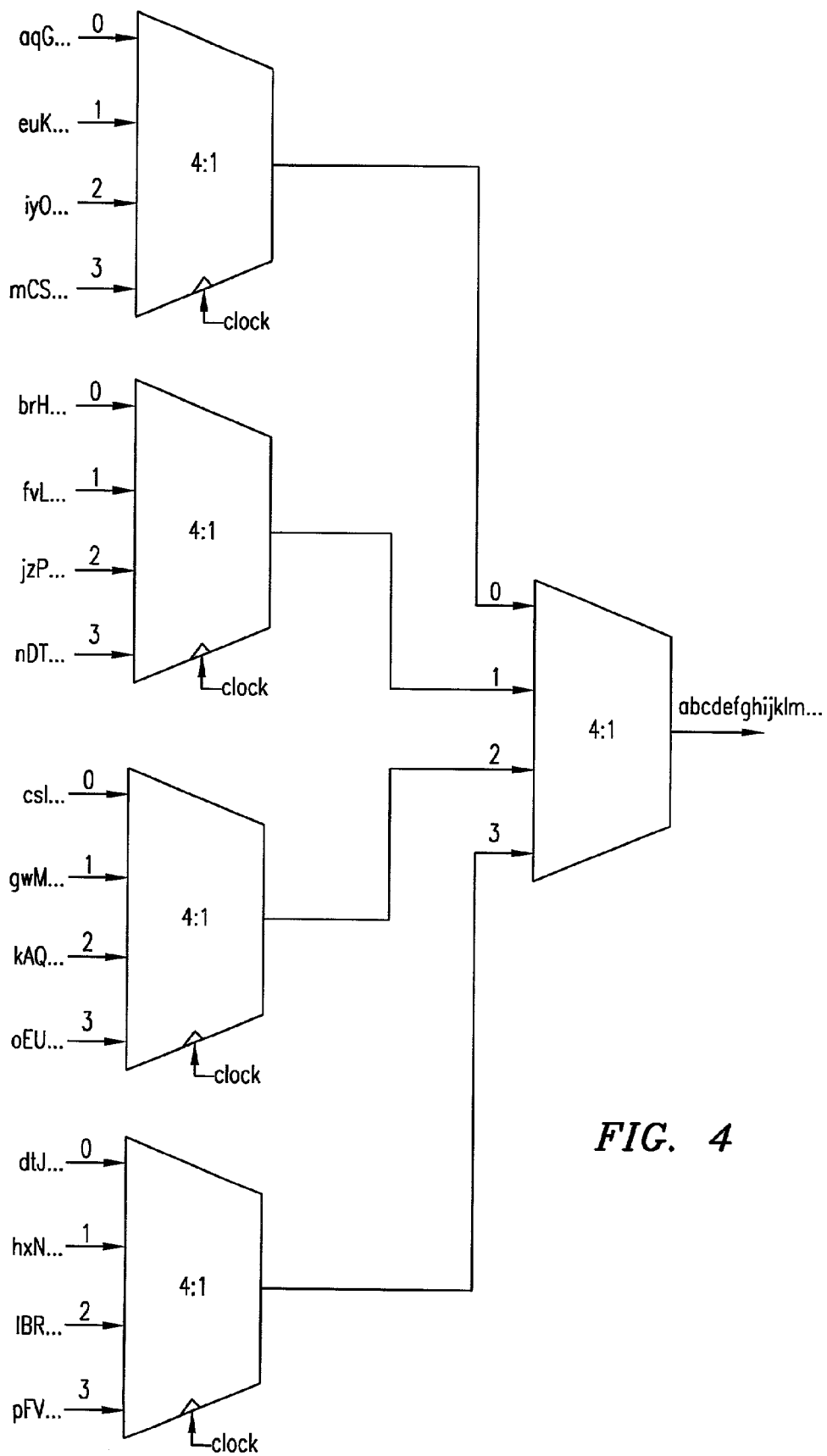
FIG. 4 is a diagram illustrating an operation of a synchronized, multiple-stage multiplexer.
Figure 5:
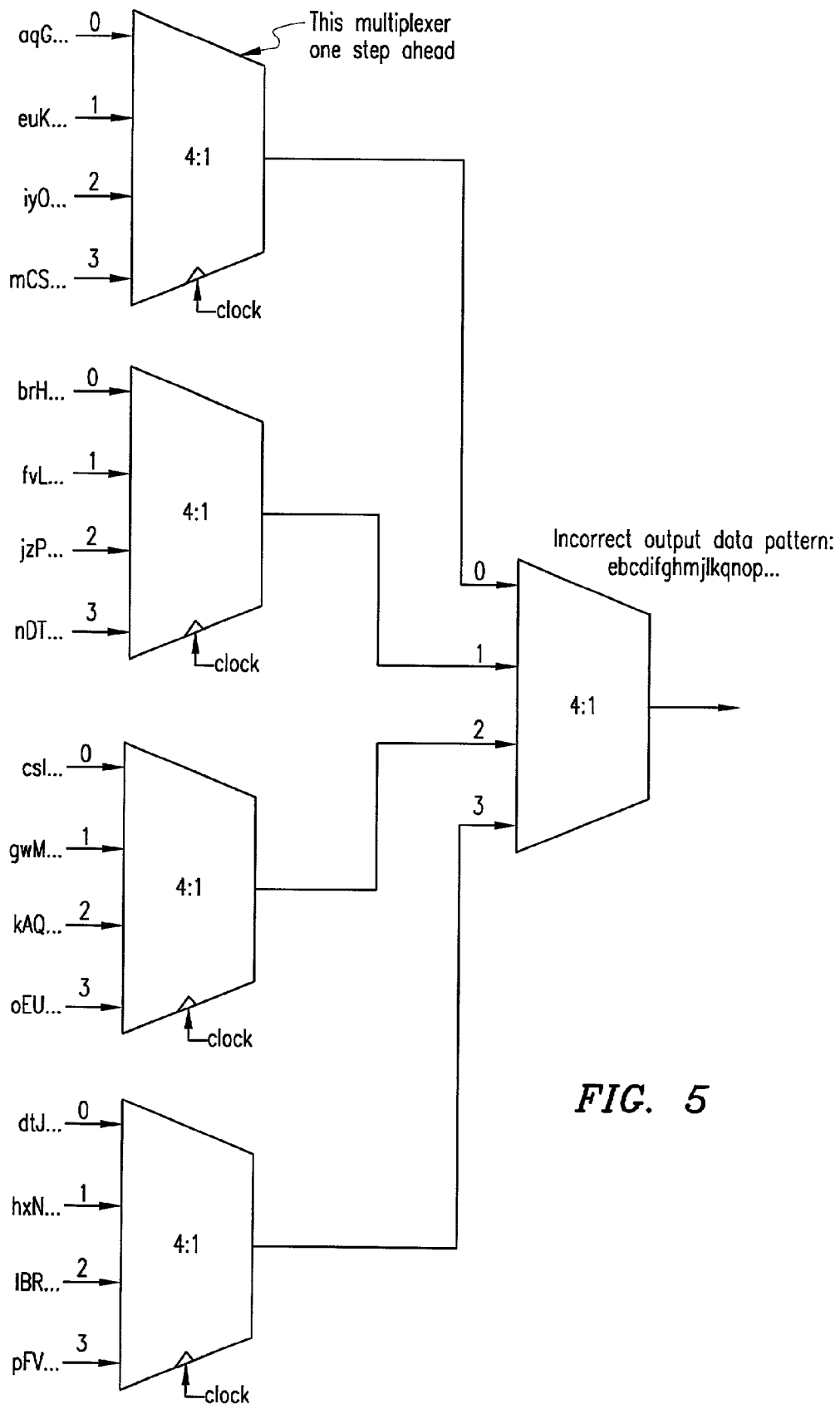
FIG. 5 is a diagram illustrating an operation of an out-of-synch, multiple-stage multiplexer.
Figure 8:
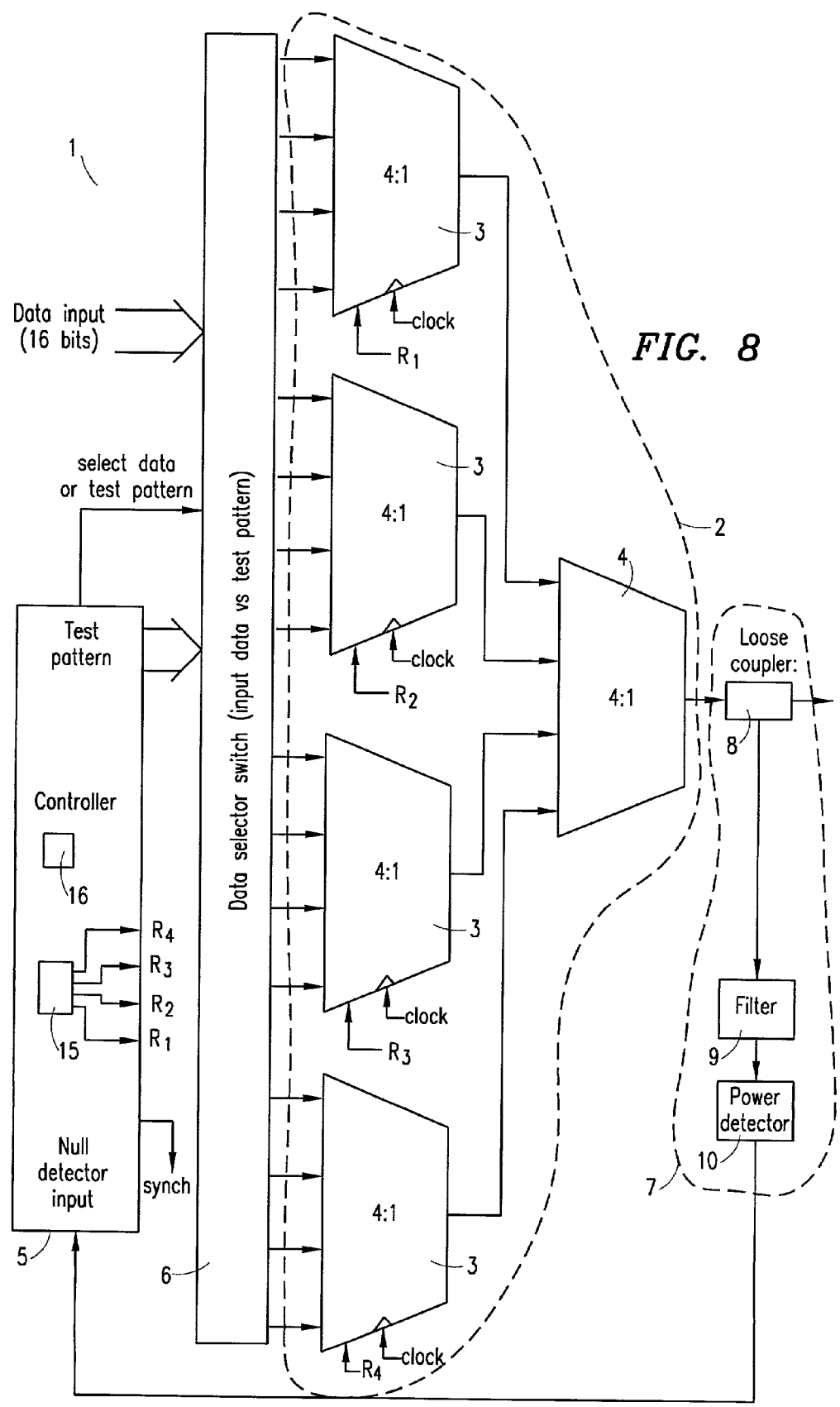
FIG. 8 is a block diagram of multiple-stage multiplexer and a synchronization circuit for synchronizing the multiple-stage multiplexer according to an exemplary embodiment of the present invention.

Referring to FIG. 8, there is shown a synchronization device 1 according to an exemplary embodiment of the present invention. Synchronization device 1 effectively synchronizes multiple-stage, serializer multiplexers, such as multiple-stage multiplexer 2 to which synchronization device 1 is connected. Multiple-stage multiplexer 2 is a serializer multiplexer of the type shown in FIG. 2. Synchronization device 1 utilizes feedback so as to synchronize multiple-stage multiplexer 2 based upon the frequency response thereof, and particularly based upon the power level of the output of multiple-stage multiplexer 2 at a predetermined frequency.

Multiple-stage multiplexer 2 is shown in FIG. 8 as a two-stage multiplexer having four 4:1 multiplexer circuits 3 in a first stage and a single 4:1 multiplexer circuit 4 in a second stage. It is understood, however, that synchronization device 1 may be configured to synchronize any multiple-stage multiplexer.

Synchronization device 1 synchronizes multiple-stage multiplexer 2 by sending static test patterns, i.e., test patterns that do not vary over time, through multiple-stage multiplexer 2 and monitoring the multiplexer output. The basic principle upon which synchronization device 1 is based is that there are static data patterns that exhibit near complete cancellation of the power level at certain frequencies, and exhibit substantially larger power levels at the certain frequencies when the bit positions of the static data patterns are switched. These static data patterns are used by synchronization device 1 to identify when multiple-stage multiplexer 2 is synchronized.

Synchronization device 1 includes a controller 5 that provides test patterns to multiple-stage multiplexer 2. In accordance with an exemplary embodiment of the present invention, controller 5 selectively places multiplexer circuits 3 in different states until the test patterns sent through multiple-stage multiplexer 2 yield, at the output thereof, a predetermined or minimum power level at a frequency that is harmonically related to the data input rate, such as the frequency corresponding to the data input rate. The test patterns provided by controller 5 are static test patterns that result in multiple-stage multiplexer 2 generating data patterns of the type described above.

Figure 6:
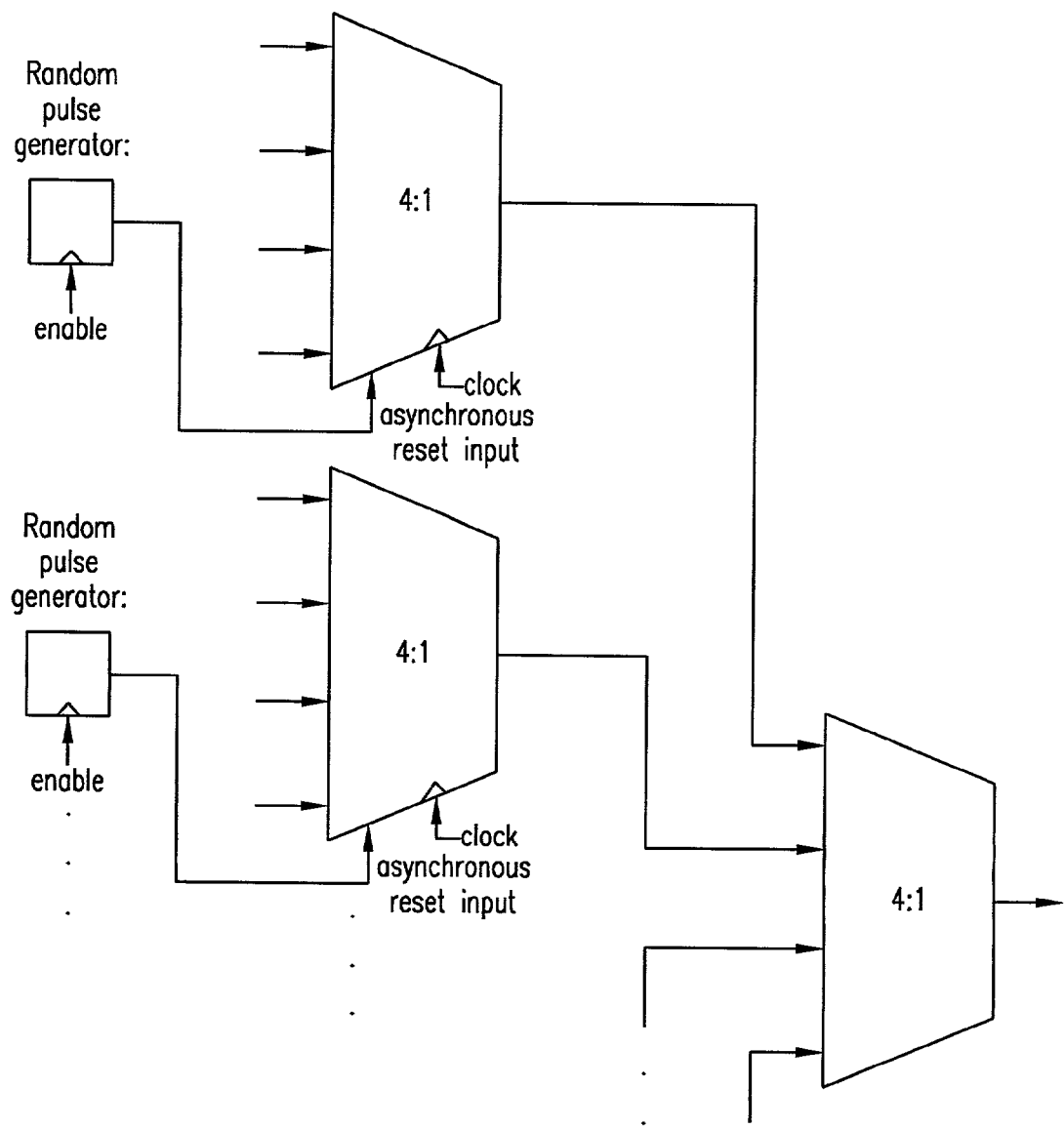
FIG. 6 is a block diagram of conventional synchronization circuitry in association with a multiple-stage multiplexer.
Figure 7:
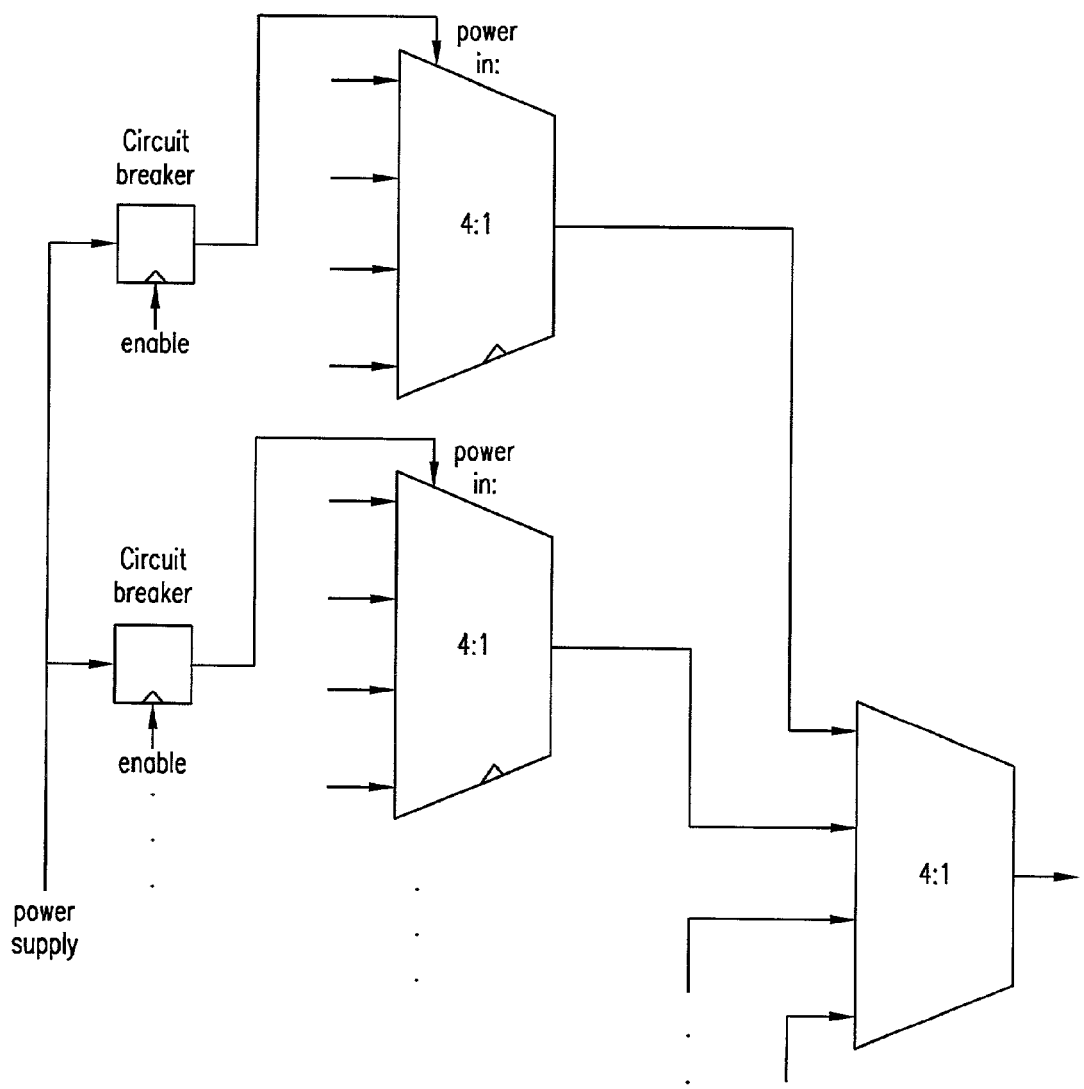
FIG. 7 is a block diagram of another conventional synchronization circuit in association with a multiple-stage multiplexer.

In placing multiplexer circuits 3 in different states, controller 5 may, for example, place multiplexer circuits 3 in substantially random states. In this case, controller 5 includes random pulse generator circuitry 15 which asserts reset signals R1–R4 at substantially random times, similar to the reset circuitry shown in FIG. 6. As a result, multiplexer circuits 3 are selectively and individually reset at substantially random times. It is understood, however, that controller 5 may alternatively utilize other hardware, software or a combination thereof to place multiplexer circuits 3 in substantially random states. For instance, controller 5 may include the circuit breaker circuitry shown in FIG. 7, for temporarily removing power to multiplexer circuits 3. It is understood that controller 5 may place multiplexer circuits 3 in different states using techniques other than placing multiplexer circuits 3 in substantially random states. Controller 5 may generate test patterns, monitor feedback signals and perform other controller functions described below using software instructions stored in memory 16 in controller 5.

Synchronization device 1 further includes switching circuitry 6 disposed between test pattern outputs of controller 5 and data inputs of multiple-stage multiplexer 2. Switching circuitry 6 allows controller 5 to select between test patterns generated by controller 5 and data generated by other circuitry during a normal (i.e., non-test) mode of operation. The output of switching circuitry 6 is connected to the data inputs of multiple-stage multiplexer 2.

As stated above, controller 5 places multiplexer circuits 3 in substantially random states until the test pattern sent through multiple-stage multiplexer 2 produces a predetermined or a minimum power level at the output thereof Controller 5 monitors the power level appearing at the output of multiple-stage multiplexer 2 using feedback circuitry 7. Feedback circuitry 7 includes a coupler 8 that diverts a relatively small amount of the signal appearing at the output of multiple-stage multiplexer 2. A filter 9, such as a band pass filter, is connected to an output of coupler 9. Filter 9 filters the signal diverted by coupler 8 so that only frequency components of the pass band appear at the output of filter 9. In this case, the pass band center frequency of filter 9 is the input data rate to multiple-stage multiplexer 2. Feedback circuitry 7 further includes a power detector 10 which receives the output of filter 9 and measures the amount of power in the spectral component at the center frequency of filter 9. The output of power detector 10 is fed back to an input of controller 5 so as to complete the feedback loop formed by feedback circuitry 7.

It is understood that filter 9 and power detector 10 may be implemented as analog circuitry. Although filter 9 is described in synchronization device 1 as a band pass filter, it is understood that filter 9 may be a low pass filter that passes the input data rate frequency while suppressing the harmonics thereof. It is further understood that in the event only relative power levels are needed to be provided by power detector 10, it is unnecessary for power detector 10 to be linear or otherwise have any particular absolute calibration capability.

Figure 9:
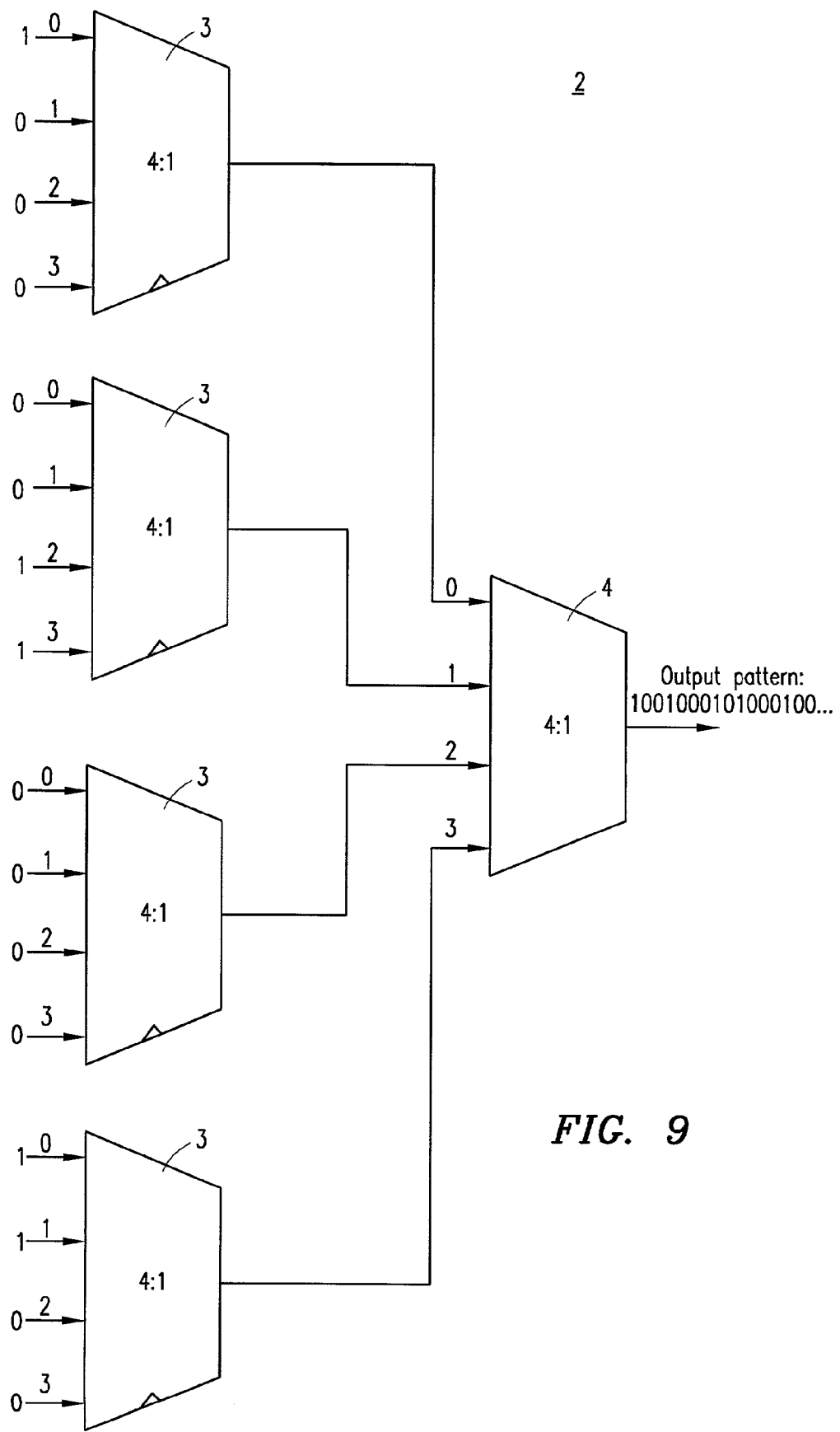
FIG. 9 is a block diagram of a multiple-stage multiplexer having a test pattern applied to the data input thereof, by the synchronization circuit shown in FIG. 8.

As stated above, there are static data patterns that exhibit near complete cancellation of the power level at certain frequencies, and exhibit substantially larger power levels at the certain frequencies when the bits of the static data patterns are scrambled. One data pattern is serial data pattern "1001000101000100", which would require a static test pattern of "1000001100001100" to be applied in parallel to the input of multiple-stage multiplexer 2 in order for the data pattern to appear at the output thereof The test pattern is shown being applied to multiple-stage multiplexer 2 in FIG. 9. The test pattern provides a theoretical null depth of approximately 25 dB at the output of multiple-stage multiplexer 2 when synchronized.

Suppose multiplexer circuit 3 appearing at the top in FIG. 8 is considered the reference multiplexer circuit to which the other three multiplexer circuits 3 must be synchronized. It can be seen that the other three multiplexer circuits 3 may be in 64 possible combinations of states. Because each of the other three multiplexer circuits 3 must be synchronized to the reference multiplexer circuit 3 in order for the test pattern to provide a substantially canceled power level at the multiplexer output, all 64 possible combinations of states must be searched.

It is noted, however, that the particular test pattern "1000001100001100" results in the third multiplexer circuit 3 from the top in FIG. 8 having all of its data inputs set to a logic zero. The output generated by the third multiplexer circuit 3 will always be logic zero and is therefore independent of state. Consequently, there are only 16 possible states to be searched (corresponding to the states of the second and fourth multiplexer circuits 3 from the top in FIG. 8) in order to synchronize the second and fourth multiplexer circuits 3. Once the second and fourth multiplexer circuits 3 are synchronized, the third multiplexer circuit 3 from the top in FIG. 8 may be synchronized by delaying the test pattern "1000001100001100" by one clock period. The delayed test pattern is "0110100000110000" and produces at the output of a synchronized multiple-stage multiplexer 2 the serial pattern "1001000101000100". Because there are only four possible states for the third multiplexer circuit 3 following the second and fourth multiplexer circuits 3 being synchronized, there are only a total of 20 possible states of the second, third and fourth multiplexer circuits 3 to be searched to synchronize multiple-stage multiplexer 2.

Figure 10:
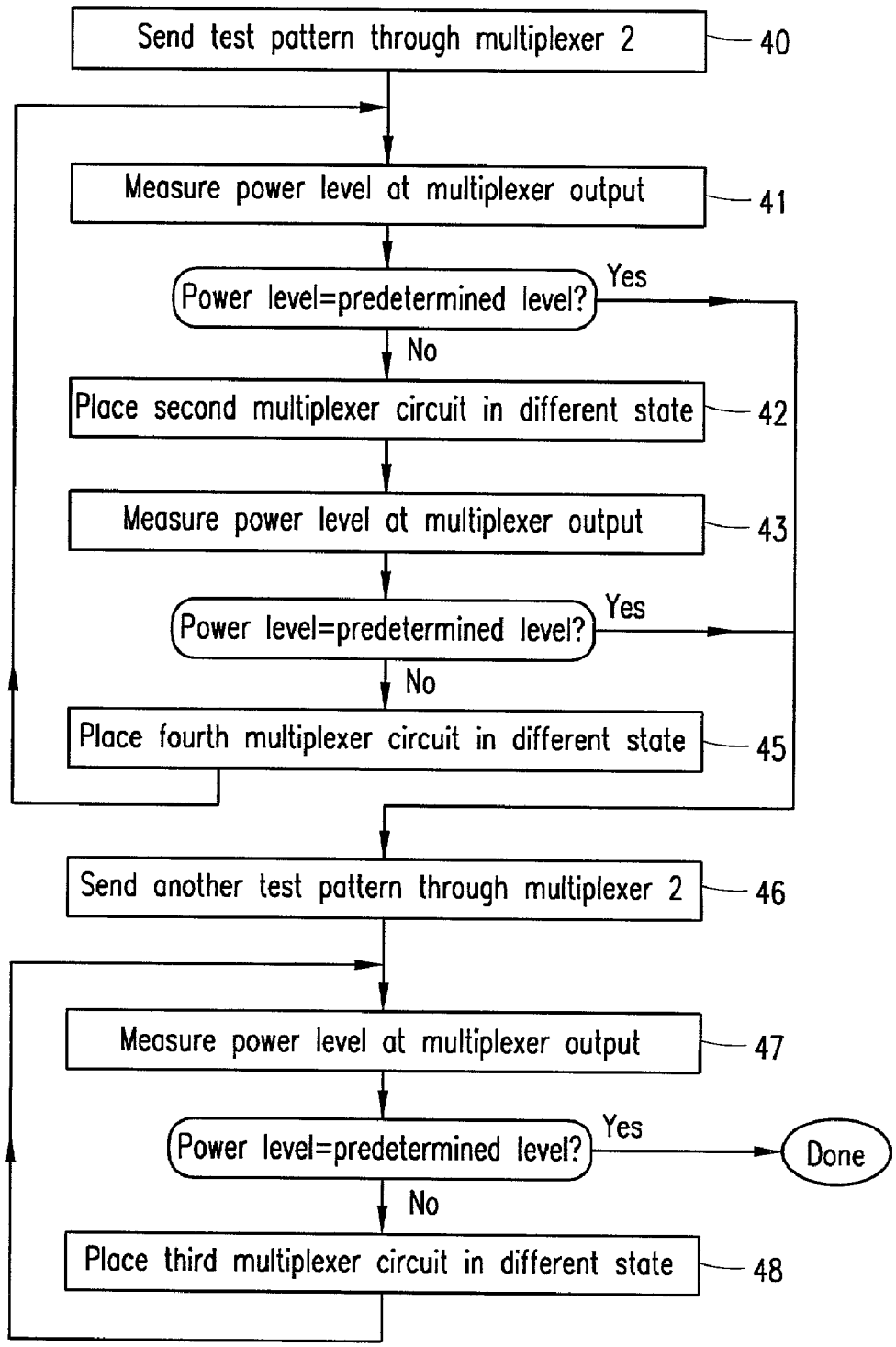
FIG. 10 is a flow chart illustrating an operation of the synchronization circuit of FIG. 8.

The operation of synchronization device 1 to synchronize multiple-stage multiplexer 2 will be described with reference to FIG. 10. First, test pattern "10000011000001100" is continuously sent through multiple-stage multiplexer 2 at 40. The test pattern is applied in parallel to the data inputs of multiple-stage multiplexer 2 as a clock signal is applied to the clock input of multiple-stage multiplexer 2. The output power level of multiple-stage multiplexer 2 is measured at 41 at the frequency corresponding to the input data rate. In the event the measured power level is below a predetermined level, controller 5 determines that the second and fourth multiplexer circuits 3 (as viewed from the top of FIG. 8) are synchronized with the first multiplexer circuit 3.

In the event the measured power level does not fall below the predetermined level, the second multiplexer circuit 3 (from the top as shown in FIG. 8) is placed in a different state at 42. For example, the second multiplexer circuit 3 may be placed in a substantially random state by resetting the second multiplexer circuit 3 at a substantially random time. The power level output of multiple-stage multiplexer 2 at the frequency corresponding to the input data rate is measured at 43. In the event the measured power level falls below the predetermined level, controller 5 determines that second and fourth multiplexer circuits 3 are synchronized with the first multiplexer circuit 3.

In the event the measured power level does not fall below the predetermined level, the fourth multiplexer circuit 3 (from the top as shown in FIG. 8) is placed in a different state at 45 and the operation returns to step 41.

It is understood that instead of placing the second and fourth multiplexer circuits 3 in different states until the output power level falls below the predetermined level, synchronization device 1 may place the second and fourth multiplexer circuits 3 in a number different states and thereafter identify the state producing the smallest or minimum output power level.

When the second and fourth multiplexer circuits 3 have been synchronized with the first multiplexer circuit 3, the test pattern "0110100000110000", which is test pattern "1000001100001100" delayed by one-period of the multiplexer clock, is continuously sent through multiple-stage multiplexer 2 at step 46. The power level of the multiplexer output is measured at 47. In the event the measured power level does not fall below a second predetermined level, the third multiplexer circuit 3 is placed in a different state, such as a substantially random state, at 48. Steps 47 and 48 are repeated until the measured power level falls below the second predetermined level, at which point controller 5 determines that all multiplexer circuits 3 are synchronized with each other.

It is understood that instead of placing the third multiplexer circuit 3 in different states until the output power level falls below the second predetermined level, synchronization device 1 may place the third multiplexer circuit 3 in a number of different states and thereafter identify the state producing the smallest or minimum output power level.

It is understood that test pattern "1000001100001100" can be delayed at step 46 by clock periods other than one clock period. For instance, test pattern "1000001100001100" can also be delayed by a number of clock periods between two and 15. It is further understood that test patterns other than "1000001100001100" may be used in synchronizing multiplexer circuits 3. For instance, test pattern "100011010010110" may be sent through multiple-state multiplexer 3. Test pattern "100011010010110" provides a null depth of approximately 20 dB at the output of multiple-stage multiplexer 2.

As stated above, the operation of synchronization device 1 to synchronize multiple-stage multiplexer 2 may require the capability to place multiplexer circuits 3 in substantially random states. It has been observed, however, that sometimes there are states into which a multiplexer circuit 3 is rarely randomly placed. The exact understanding of and fixes for this phenomenon is not well understood. Because some multiplexer circuits 3 may rarely be substantially randomly placed in a certain state, synchronization device 1 sometimes may ineffectively synchronize multiple-stage multiplexer 2.

Figure 11:
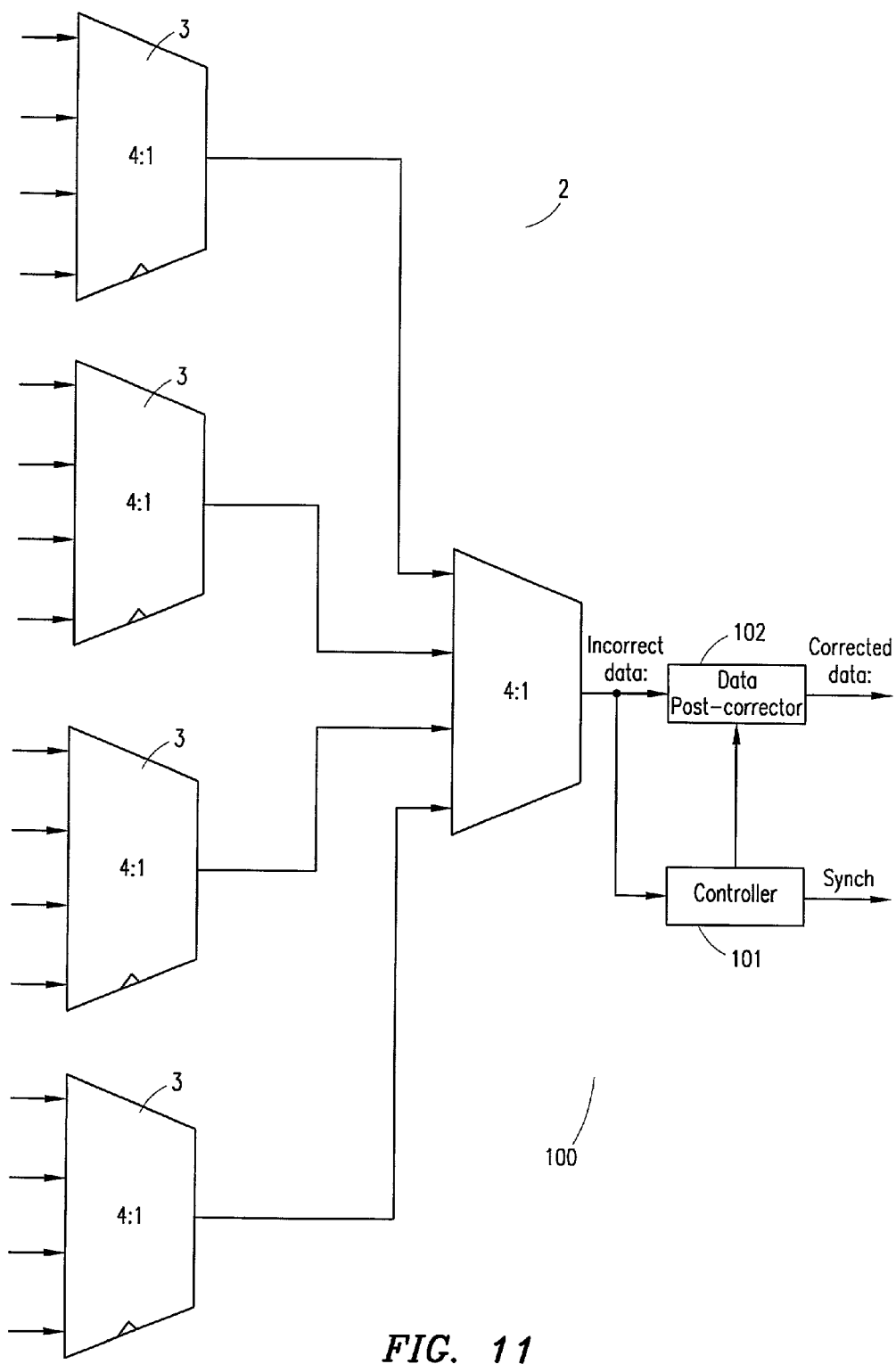
FIG. 11 is a block diagram of a synchronization apparatus for synchronizing a multiple-stage multiplexer according to another exemplary embodiment of the present invention.

FIG. 11 illustrates a compensation device 100 according to another exemplary embodiment of the present invention. Compensation device 100 is capable of compensating for multiple-stage multiplexer 2 being out of synch without having to place multiplexer circuits 3 in different states. Compensation device 100 instead monitors the output data generated by multiple-stage multiplexer 2 and applies post-processing correction thereto, based upon the monitored output data. In this way, compensation device 100 compensates for multiple-stage multiplexer 2 being out of synch.

Specifically, compensation device 100 includes a controller 101 and a data correction block 102. Controller 101 is capable of determining the state of each multiplexer circuit 3 based upon the data generated by multiple-stage multiplexer 2. Controller 101 controls data correction block 102 so as to provide the necessary correction of the data generated by multiple-stage multiplexer 2. Although, in theory, compensation device 100 is capable of compensating for multiple-stage multiplexer 2 being out of synch, compensation device 100 is generally impractical because any post-processing corrections occur at higher speeds, i.e., at the data rate of the output of multiple-stage multiplexer 2.

Figure 12:
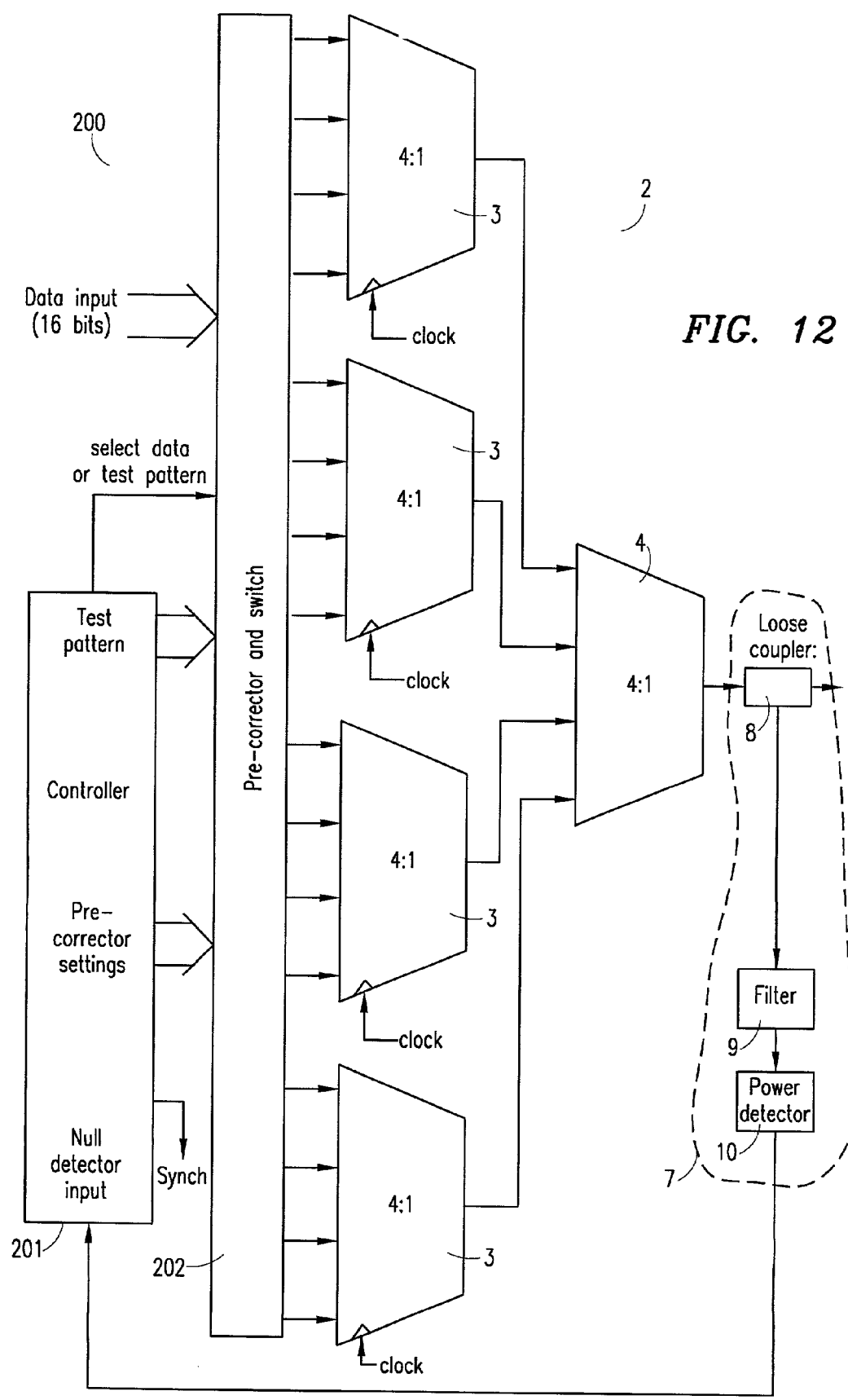
FIG. 12 is a block diagram of a synchronization apparatus for synchronizing a multiple-stage multiplexer according to another exemplary embodiment of the present invention.

FIG. 12 shows another exemplary embodiment of the present invention capable of synchronizing multiple-stage multiplexer 2 without having to place multiplexer circuits 3 in different states and without performing post-processing correction. In general terms, compensation circuit 200 replaces post-processing data correction with pre-processing data correction. Compensation circuit 200 utilizes the same feedback circuitry 7 (coupler 8, filter 9 and power detector 10) used by synchronization device 1 of FIG. 8. The feedback signal generated by power detector 10 is fed to controller 201. Based upon the power level measured by power detector 10, controller 201 initiates pre-correction operations so that patterns (data or test) applied to the data inputs of multiple-stage multiplexer 2 are compensated for multiplexer circuits 3 being out of synch with each other.

Compensation circuit 200 includes a pre-corrector 202 disposed between the data output of controller 201 and the data inputs of multiple-stage multiplexer 2. Pre-corrector 202 performs as a switch in allowing controller 201 to select for application to multiple-stage multiplexer 2 test patterns provided by controller 201 and data provided by other data sources during a normal mode of operation. In addition, pre-corrector 202 receives pre-correction settings from controller 201 and performs pre-correction operations on patterns (test or data) sent through multiple-stage multiplexer 2 in order to compensate for multiplexer circuits 3 being out of synch.

With regard to the types of pre-correction operations pre-corrector 202 selectively performs, consideration is first given to pre-corrections for static test patterns, i.e., test patterns that do not vary over time. For exemplary reasons, each multiplexer circuit 3 is described as sequentially transferring its input data bits in order from the top input data bit to bottom input data bit. For multiple-stage multiplexer 2 to be synchronized, the data bit at the top of each multiplexer circuit 3 is provided to multiplexer circuit 4 during the same clock cycle of the multiplexer clock.

Figure 13:
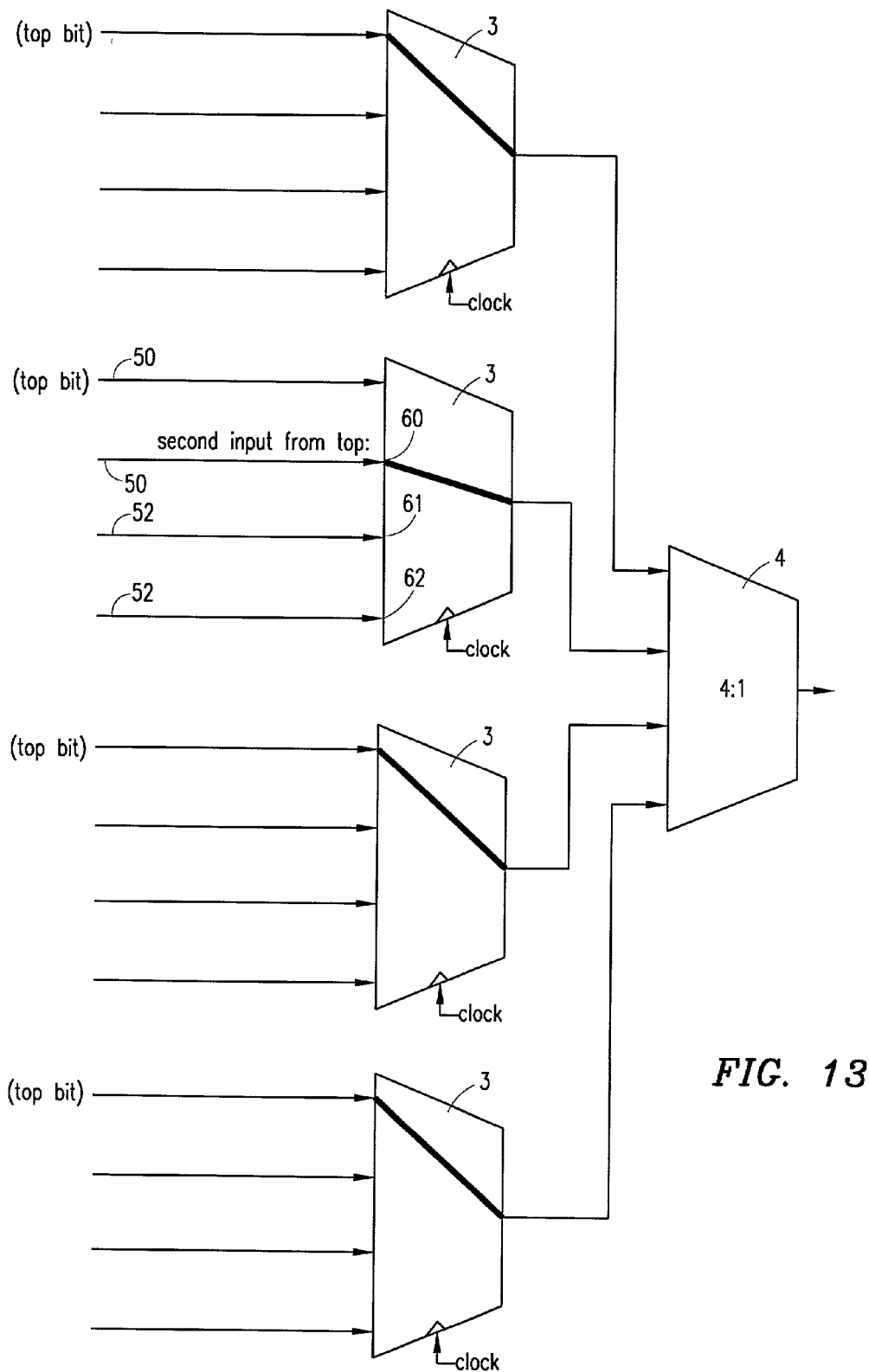
FIG. 13 is a block diagram illustrating an out-of-synch multiple-stage multiplexer.
Figure 14:
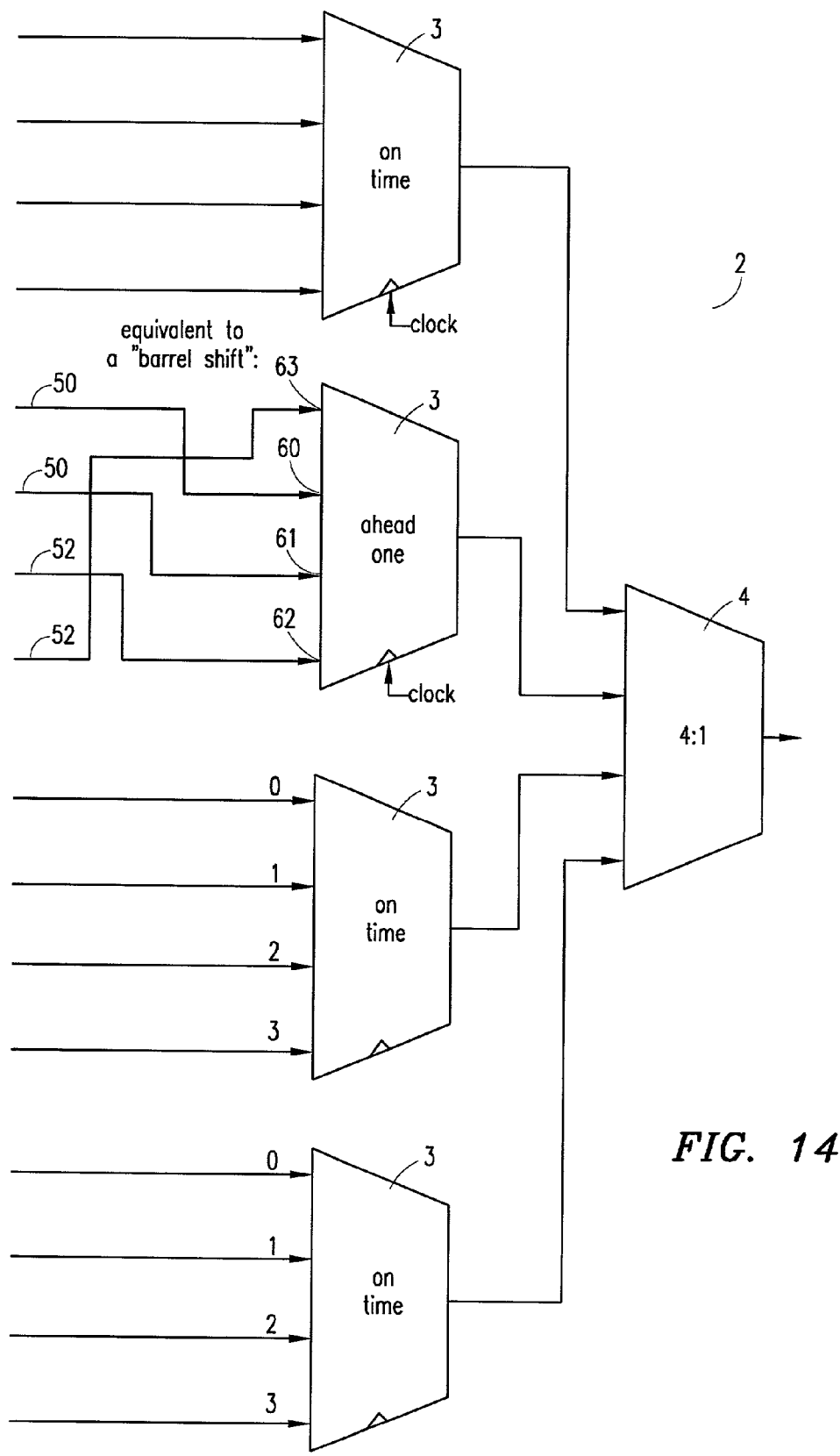
FIG. 14 is a block diagram illustrating a barrel shifting operation of the synchronization apparatus of FIG. 12.

Suppose, however, the second multiplexer circuit 3 from the top in FIG. 12 is one clock cycle ahead of the other multiplexer circuits 3. FIG. 13 illustrates the case when the second multiplexer circuit 3 is one clock cycle ahead of the other multiplexer circuits 3. In this scenario, the necessary pre-correction is to shift the top input data bit 50 of the second multiplexer circuit 3 to the second (from the top) input data bit location 60; the second input data bit 51 to the third input data bit location 61, the third input data bit 52 to the fourth input data bit location 62; and the fourth input data bit 53 to the first (top) input data bit location 63. This shifting, which is the equivalent to a barrel shift operation, is illustrated in FIG. 14. As can be seen, the barrel shift pre-correction operation on the data input bits 50–53 of the second multiplexer circuit 3 results in the multiplexer circuit 4 receiving the data pattern in the correct order. In this way, pre-corrector 202 may be implemented with barrel shifting circuitry to correct the order of the static data patterns applied to multiple-stage multiplexer 2 when multiple-stage multiplexer 2 is out of synch.

It is understood that pre-corrector 202 may shift input data bits by two and three input data bit locations in the event that the corresponding multiplexer circuit 3 is two and three clock cycles, respectively, ahead of the other multiplexer circuits 3.

With further regard to the types of pre-correction operations pre-corrector 202 selectively performs, consideration is now given to pre-corrections of dynamic data patterns, i.e., data patterns that change over time. A multiplexer circuit 3 is refreshed or otherwise loaded with new data after the last data bit stored in the multiplexer circuit 3 is connected to the output thereof. Unlike in instances during which the patterns provided by controller 201 are static patterns, it is important for multiplexer circuits 3 of multiple-stage multiplexer 2 to be refreshed during the same clock period of the multiplexer clock when dynamic patterns are utilized. If a multiplexer circuit 3 is not synchronized relative to the other multiplexer circuits 3 in multiple-stage multiplexer 2, the refresh time for the out-of-synch multiplexer circuit 3 will occur an integer number of multiplexer clock periods from the refresh time of the other multiplexer circuits 3. It is thus necessary to advance or delay the arrival of the input data provided to the out-of-synch multiplexer circuit 3 by an amount corresponding to the number of multiplexer clock periods by which the out-of-synch multiplexer circuit 3 is out of synch. It can be seen that in order to be able to synchronize multiple-stage multiplexer 2, compensation circuit 200 requires the capability to modify the timing (i.e., delay) of the data inputs of multiplexer circuits 3.

Figure 15:
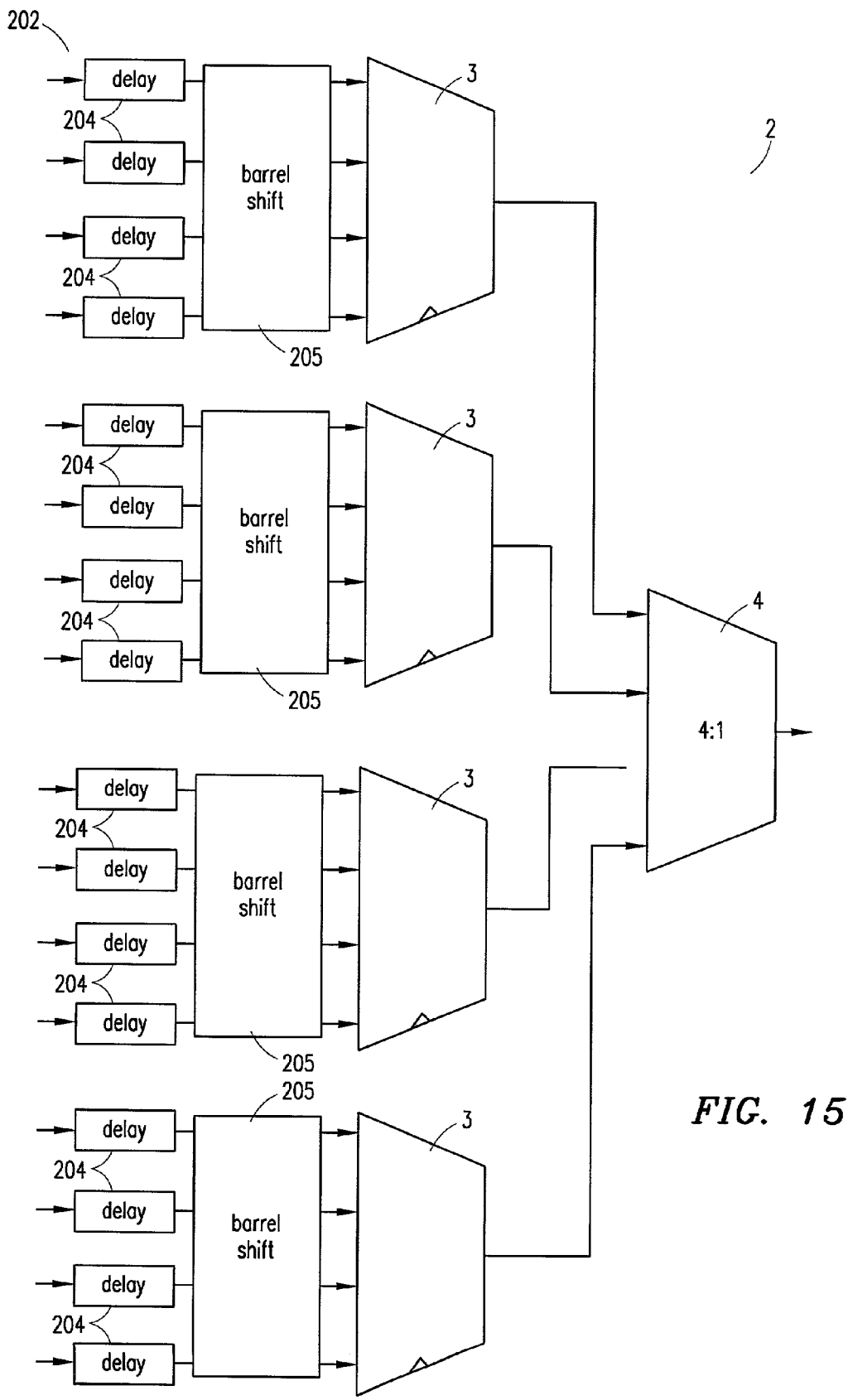
FIG. 15 is a block diagram of a pre-corrector according to the synchronization apparatus of FIG. 12.

FIG. 15 illustrates an implementation of pre-corrector 202. Pre-corrector 202 includes programmable delay elements 204 and barrel shifters 205. Programmable delay elements 204 perform the necessary signal delay to account for an out-of-synch multiplexer circuit 3 being refreshed at a different time. Barrel shift circuits 205 selectively shift the input data bits to multiplexer circuits 3. Controller 201 controls delay elements 204 and barrel shift circuits 205 so that the bits of the data pattern provided to multiplexer circuits 3 have the desired delay and positioning to compensate for one or more multiplexer circuits 3 being out of synch.

As mentioned above, it may be necessary to both advance and delay the timing of data input signals applied to a multiplexer circuit 3. Because a timing advance cannot be directly implemented, a delay of four clock periods is introduced to each data input of each multiplexer circuit 3. In the exemplary embodiment of pre-corrector 202 in FIG. 15, each data input of the multiplexer circuits 3 is given a default delay of four periods of the multiplexer clock. Noting that a timing advance is the same as a negative delay, the signal delay through each delay element 204 may be varied between a one clock period and seven clock periods of the multiplexer clock.

Figure 16:
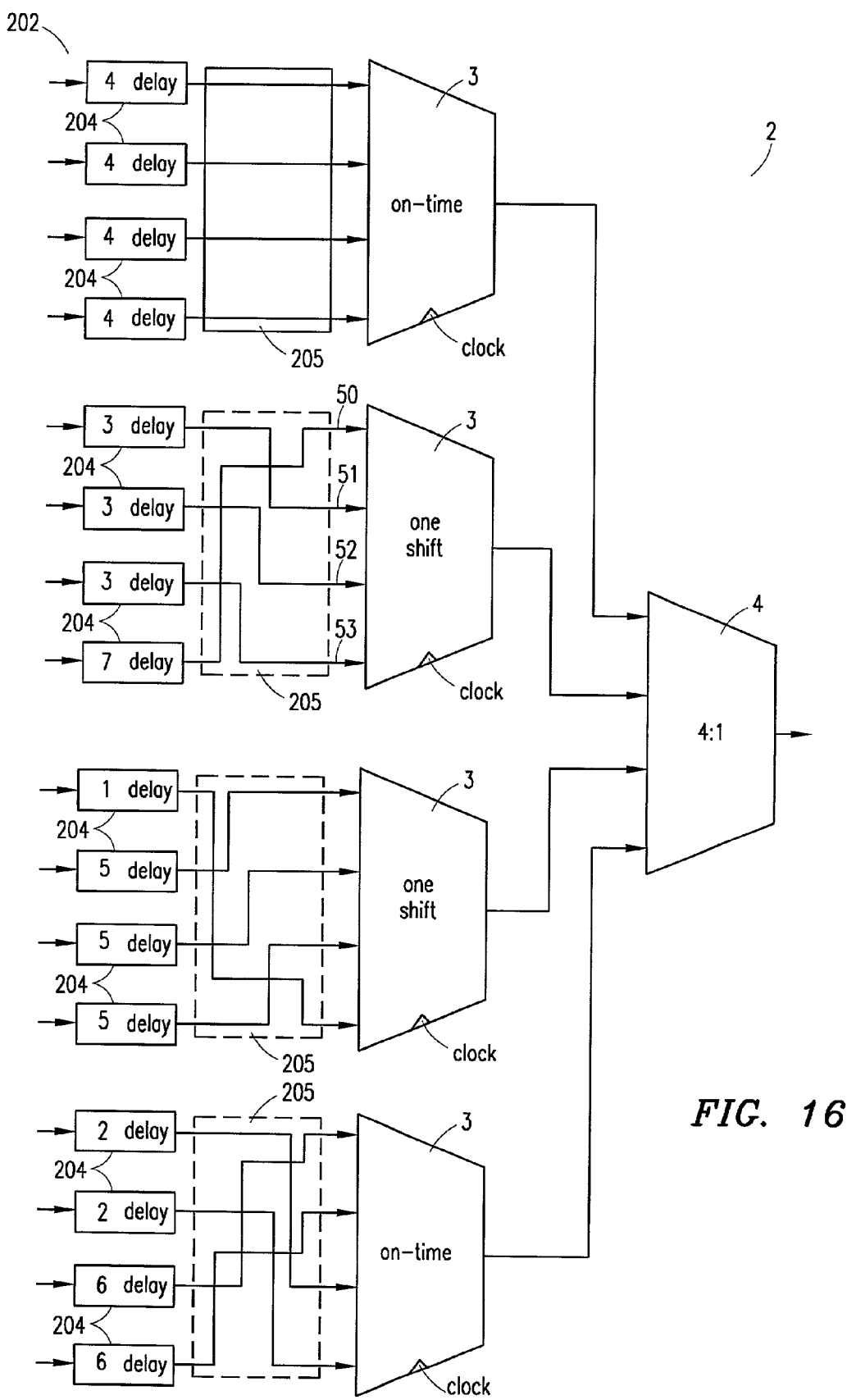
FIG. 16 is a block diagram illustrating a data pre-correction operation of the synchronization apparatus of FIG. 12.

Consider again the situation shown in FIG. 12 in which the second multiplexer circuit 3 from the top is one clock cycle ahead of the other multiplexer circuits 3. The refresh time of the second multiplexer circuit 3 occurs one clock period sooner than the refresh time of the other multiplexer circuits 3. To compensate for the difference in refresh times between the second multiplexer circuit 3 and the other multiplexer circuits 3, the three top-most data input bits 50–52 to the second multiplexer circuit 3 need to advance by a single clock cycle of the multiplexer clock. In addition, the bottom data input bit 53 of second multiplexer circuit 3 requires a delay of three clock cycles. FIG. 16 illustrates the pre-correction settings for the second multiplexer circuit 3. Noting that the top multiplexer circuit 3 is the reference multiplexer circuit, the three upper data input bits 50–52 to the second multiplexer circuit 3 occur one clock period prior to the data input bits for the top multiplexer circuit (a delay of three clock periods versus four clock periods). The lowest data input bit 53 of the second multiplexer circuit 3 occurs three clock periods after the data input bits of the first multiplexer circuit 3 (seven clock periods versus four clock periods). FIG. 16 additionally shows the pre-corrections performed on the third multiplexer circuit 3 (seen from the top of FIG. 16) in the event the third multiplexer circuit 3 is one multiplexer clock behind the reference (top) multiplexer circuit.

Figure 17:
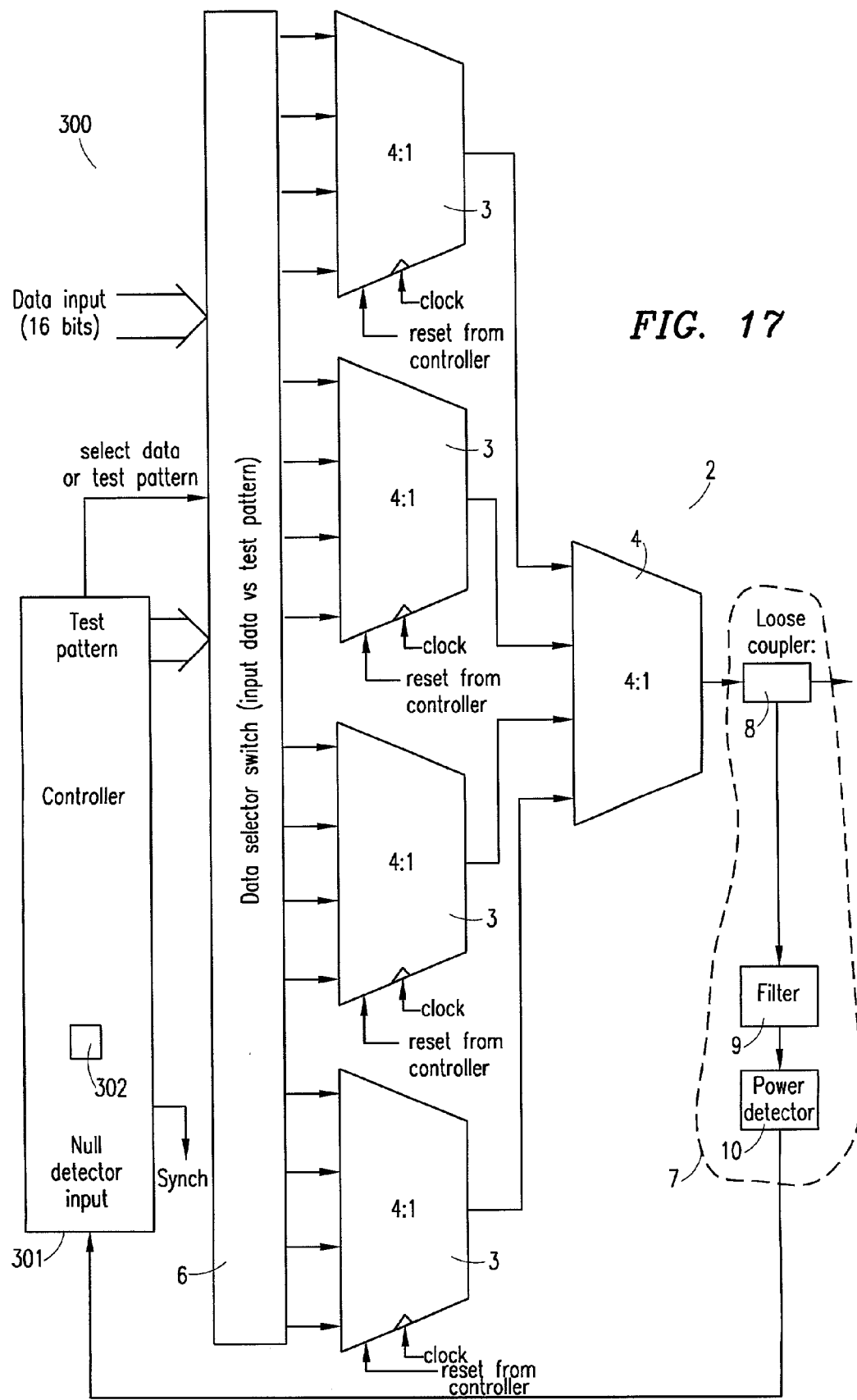
FIG. 17 is a block diagram of a synchronization apparatus according to another exemplary embodiment of the present invention.

It is understood that instead of implementing pre-corrector 202 in hardware, pre-corrector 202 may be implemented in software executed by controller 201. In this case, the software instructions for performing the timing delays and signal shifting operations may be stored in memory within the controller. FIG. 17 illustrates a compensation circuit 300 according to another exemplary embodiment of the present invention in which controller 301 performs timing delays and signal shifting operations in software. Instructions for executing the timing delays and signal shifting operations are maintained in memory 302

The operation of compensation circuits 200 and 300 will be described with reference to FIG. 18. Initially, the first multiplexer circuit 3 from the top in FIGS. 15 and 17 is considered the reference multiplexer circuit. The initial pre-correction settings are placed at step 50. A test pattern, such as static test pattern "1000001100001100", is continuously sent through multiple-stage multiplexer 2 at 51. The value of the output signal generated by power detector 10 is measured at 52. In the event that the measured power level of the output signal does not fall below a predetermined level, pre-corrections settings for the second and fourth multiplexer circuits 3 (as viewed from the top of FIGS. 15 and 17) are performed at 53, and steps 52 and 53 are repeated until the output power level falls below the predetermined level. Thereafter, another test pattern, such as static test pattern "0100100000110000", is continuously sent through multiple-stage multiplexer at 54. The power level appearing at the output of power detector 10 is measured at 55. In the event the measured power level of the measured output signal does not fall below a second predetermined level, such as zero, pre-corrections settings for the third multiplexer circuit 3 is performed at 56. Steps 55 and 56 are repeated until the output power level falls below the second power level, at which point multiple-stage multiplexer 2 is fully compensated for being out of synch. The pre-correction settings that yield the second predetermined power level are maintained during normal (i.e., non-test) operation so that the compensation of multiple-stage multiplexer 2 allows multiple-stage multiplexer 2 to behave as if it was synchronized.

It is understood that instead of providing pre-corrections to the second, third and fourth multiplexer circuits 3 until the output power level falls below the predetermined levels, compensation circuits 200 and 300 may provide pre-corrections to the second, third and fourth multiplexer circuits 3 and thereafter identify the state producing the smallest or minimum output power level.

Figure 18:
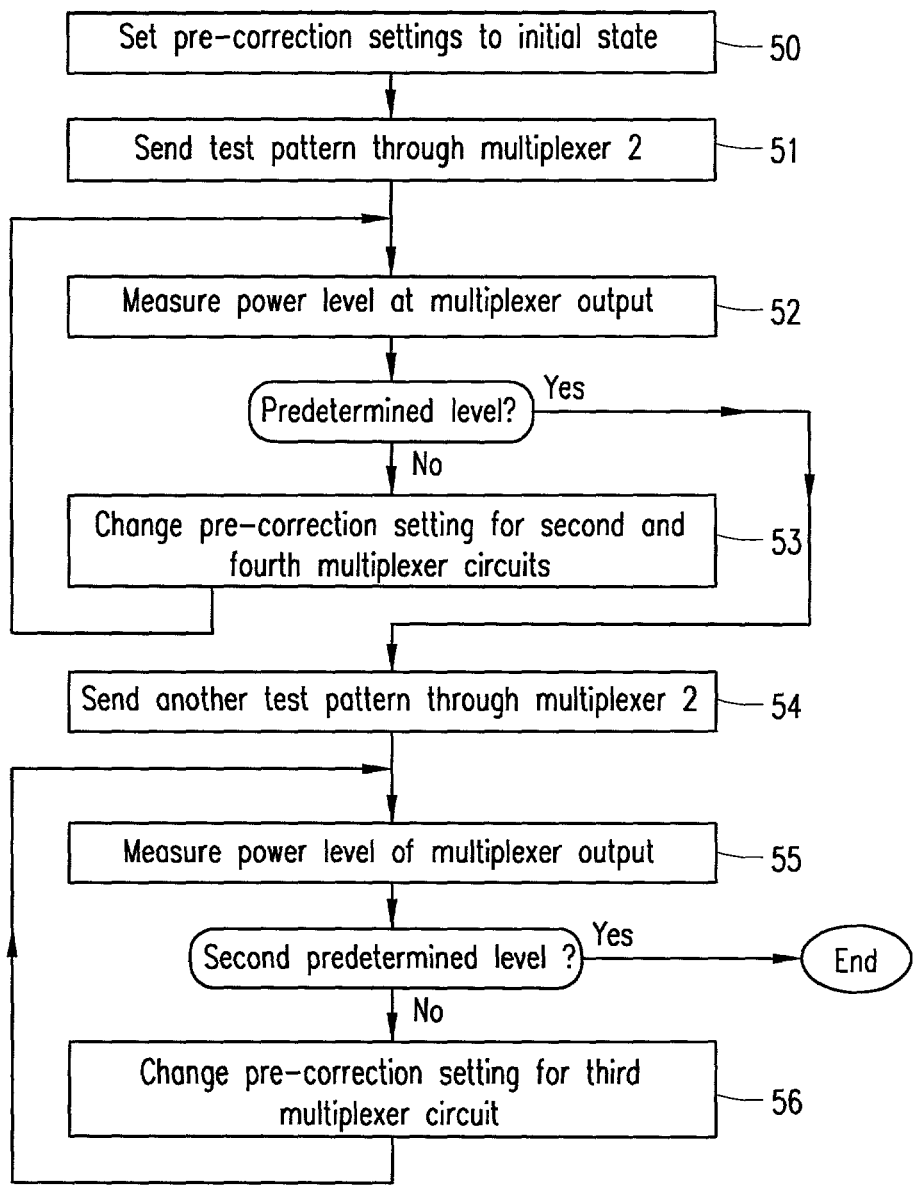
FIG. 18 is a flow chart illustrating an operation of the synchronization apparatus of FIGS. 12 and 17.

Depending upon the interface between data source 5 and multiple-stage multiplexer 2, there is a possibility of an ambiguity occurring during the operation of FIG. 18. In particular, the operation of FIG. 18 may lead to a multiplexer circuit 3 that is 180 degrees out of synch relative to the reference multiplexer circuit 3 being represented as a two clock period delay or advance This can result in all four data inputs of the 180 degree out-of-synch multiplexer circuit 3 being incorrectly ahead or behind in time by four clock periods of the multiplexer clock, due to the pre-corrections provided by compensation circuits 200 and 300. Because static patterns, including the static test patterns described above with respect to FIG. 9, are insensitive to detecting an ambiguity when a multiplexer circuit 3 is 180 degrees out of synch, a dynamic test pattern is needed.

Figure 19:
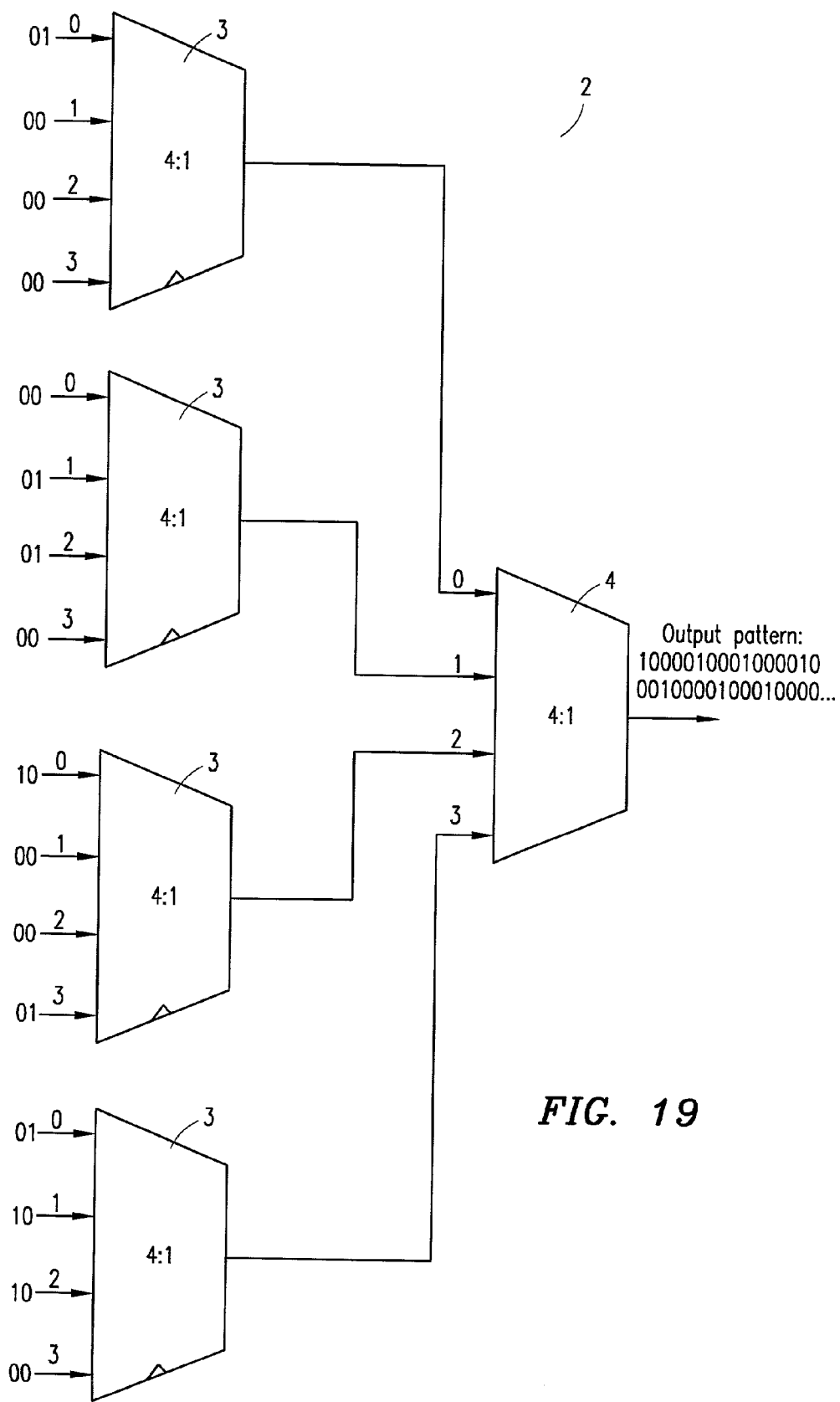
FIG. 19 is a block diagram of a multiple-stage multiplexer having a dynamic test pattern applied thereto.

A dynamic test pattern that detects the occurrence of an 180 degree out-of-synch multiple-stage multiplexer having incorrect pre-correction settings is illustrated in FIG. 19. Some bits in the dynamic test pattern alternate between logic one and logic zero in successive clock periods, thereby providing sequences having a 50 percent duty cycle. When properly compensated, multiple-stage multiplexer 2 generates a data output pattern having approximately 20 dB nulls at frequencies of the input data rate and half of the input data rate. In the event the above-described ambiguity occurs, the null at the frequency of half the input data rate is lost. Therefore, if the filter characteristics of filter 9 of feedback circuitry 7 is modified to pass frequencies including the input data rate and half of the input data rate, compensation circuits 200 and 300 may be capable of detecting the ambiguity. In this case, the stop band of filter 9 includes frequencies of approximately 1.5 times the input data rate and a cutoff frequency of approximately 1.25 times the input data rate.

During test, the power level of the output of multiple-stage multiplexer 2 is monitored at the frequencies of the input data rate and half of the input data rate. If an ambiguity error is detected, the delay for the bits applied to the 180 degree out-of-synch multiplexer circuit 3 is changed by four clock periods. At this point, multiple-stage multiplexer 2 is suitably compensated for being out of synch without any 180 degree ambiguities.

It is understood that instead of providing synchronization or pre-correction operations as described above, the present invention may be utilized to merely identify whether a multiple-stage multiplexer 2 is out of synch. For instance, controllers 5, 101, 201 and 301 may generate a signal SYNCH (seen in FIGS. 8, 11, 12 and 17) that indicates whether multiple-stage multiplexer 2 is out of synch. Specifically, controllers 5, 101, 201 and 301 may receive the feedback signal generated by feedback circuitry 7 and, based upon the value of the feedback signal, drive signal SYNCH to a value identifying whether multiple-stage multiplexer 2 is currently in synch. It is understood that controllers 5, 101, 201 and 301 may also generate signals that may indicate to what extent multiple-stage multiplexer 2 is out of synch. For instance, one or more signals may be generated which indicate the particular multiplexer circuits 3 that are out of synch.

Figure 20:
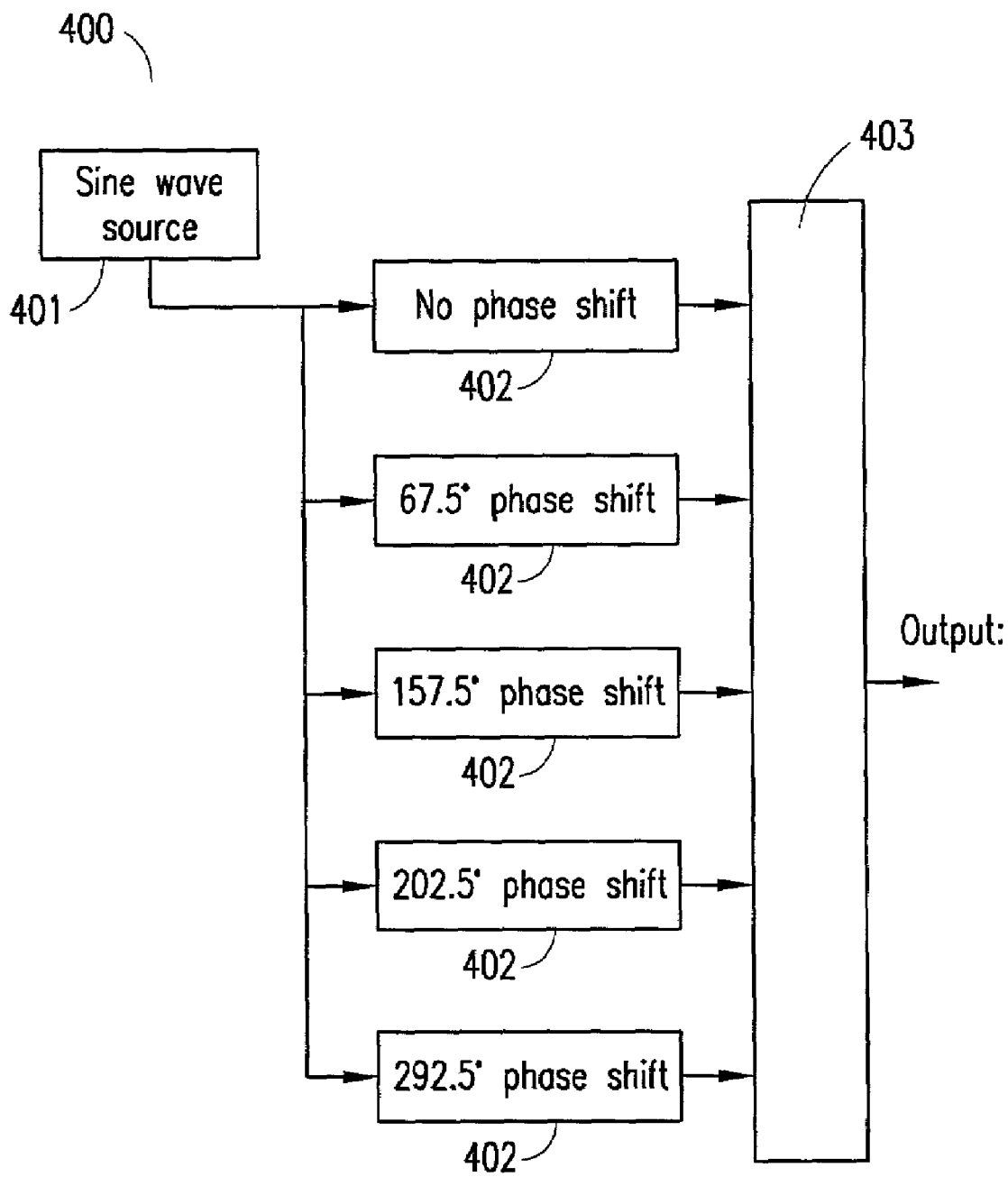
FIG. 20 is a representative linear model of the multiple-stage multiplexer of FIG. 8.
Figure 21:
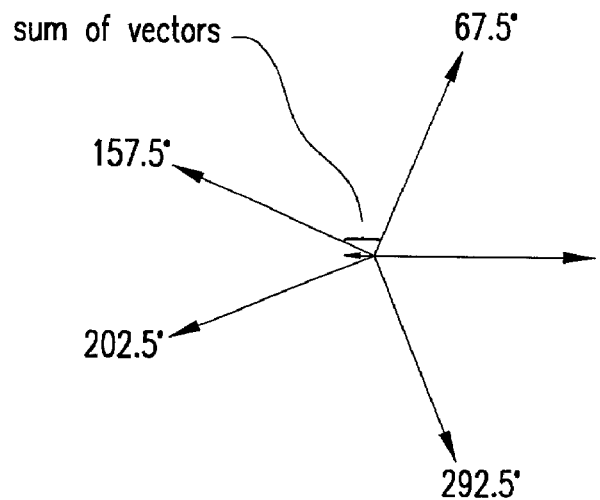
FIGS. 21 and 22 are exemplary phasor diagrams associated with the model of FIG. 19.

As stated above, certain test patterns exhibit substantially complete cancellation of the spectral component of the test pattern when the test pattern bits are correctly ordered, and exhibit sizeable spectral components when the test pattern bits are incorrectly ordered. In determining the particular test patterns to apply to multiple-stage multiplexer 2, multiple-stage multiplexer 2 is viewed as a linear superposition model. An analogous linear superposition model 400 is shown in FIG. 20. Model 400 includes a sine wave source 401 and a plurality of phase delay elements 402 connected in parallel relation to each other so that each phase delay element 402 receives the sine wave generated by sine wave source 401. Each phase delay element 402 causes a different phase delay. A combiner 403 sums the outputs of the phase delay elements 402 to produce an output signal. The output signal may be represented by the phasor diagram of FIG. 21, wherein the phases are quantized to 22.5 degree steps (360 degrees divided by the 16 possible states of multiple-stage multiplexer 2). A logic one bit input represents the presence of a vector at its corresponding angle, and a logic zero bit input represents the absence of a vector. Assuming each vector is considered to have a magnitude of 1.0, it is seen that the vectors cancel almost perfectly, leaving only a residual component with a magnitude of approximately 0.08.

Figure 22:
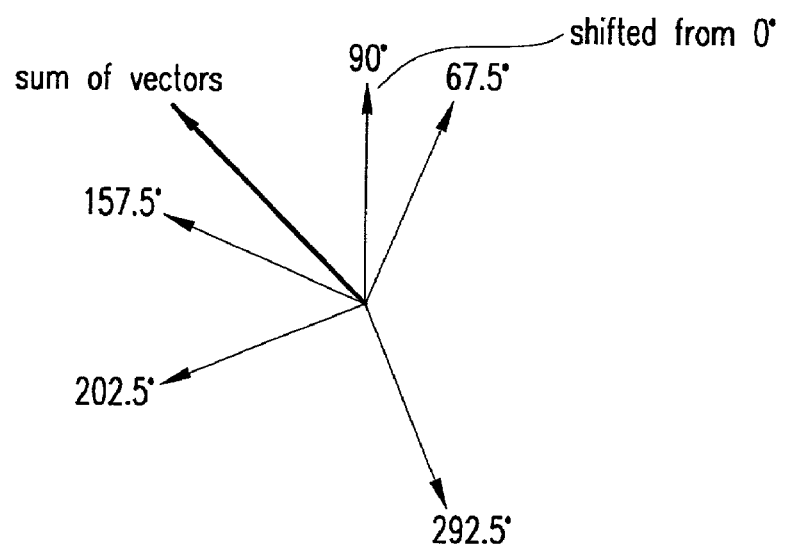

However, if a multiplexer circuit 3 is one clock period ahead, its corresponding vector will advance by 90 degrees. This may result, for example, a vector sum of approximately 1.4 (shown in FIG. 22) that is quite easy to distinguish from the residual vector sum in FIG. 21. It can be seen that if other multiplexer circuits 3 are out of synch, two vectors will shift by 90 degrees, resulting in a sum of approximately 2.0.

Since the vectors are of equal magnitude, it is seen that the derivation of appropriate test patterns includes selecting vectors that are substantially equally spaced about 360 degrees.

Although various embodiments of the method, system, and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention as set forth and defined by the following claims.

We claim:

1. An apparatus for synchronizing a multiple-stage serializer multiplexer, comprising:

feedback circuitry having an input coupled to an output of the multiple-stage multiplexer and an output generating a feedback signal indicative of a power level of the output of the multiple-stage multiplexer at a predetermined frequency; and a controller having an input coupled to the output of the feedback circuitry, a set of first outputs coupled to data inputs of the multiple-stage multiplexer, the controller selectively applying a test pattern to the data inputs of the multiple-stage multiplexer and placing the multiple-stage multiplexer in different states based upon the value of the feedback signal.

2. The apparatus of claim 1, wherein:

the multiple-stage multiplexer comprises a plurality of multiplexer circuits in a first stage thereof, and the controller individually places the multiplexer circuits in substantially random states based upon the value of the feedback signal.

3. The apparatus of claim 1, further comprising:

switching circuitry connected between the set of first outputs of the controller and the data inputs of the multiple-stage multiplexer and controlled by the controller so as to selectively connect the set of first outputs of the controller to the data inputs of the multiple-stage multiplexer.

4. The apparatus of claim 1, wherein:

the multiple-stage multiplexer comprises a plurality of first multiplexer circuits in a first stage and a second multiplexer circuit in a second stage, and successive bits of the test pattern having identical values are selectively applied by the controller to data inputs of a first multiplexer circuit.

5. The apparatus of claim 1, wherein:

the multiple-stage multiplexer comprises a plurality of first multiplexer circuits in a first stage and a second multiplexer circuit in a second stage; and wherein the controller is adapted to:

send a first test pattern through the multiple-stage multiplexer; and selectively place at least one first multiplexer circuit in a different state and repeat the sending of the first test pattern through the multiple-stage multiplexer until the feedback signal reaches a predetermined level.

6. The apparatus of claim 5, wherein the controller is further adapted to:

send a second test pattern through the multiple-stage multiplexer; and selectively place a first multiplexer circuit other than the at least one first multiplexer circuit in different states until the feedback signal reaches the predetermined level.

7. The apparatus of claim 1, wherein the feedback circuitry comprises:

a filter centered at a frequency of a data rate of the test pattern provided to the multiple-stage multiplexer by the controller.

8. The apparatus of claim 1, wherein: the predetermined frequency is a frequency corresponding to a data rate of the test pattern.

9. A method for synchronizing a multiple-stage multiplexer having a plurality of multiplexer circuits in a first stage thereof comprising:
sending a first test pattern through the multiple-stage multiplexer; and
selectively placing one or more multiplexer circuits in different states and repeating the step of sending until a power level of an output signal generated by the multiple-stage multiplexer reaches a predetermined level.

10. The method of claim 9, wherein:
the step of sending comprises sending, to at least one multiplexer circuit other than the one or more first multiplexer circuits, successive bits of the first test pattern that are identical.

11. The method of claim 9, further comprising:
sending a second test pattern through the multiple-stage multiplexer; and
selectively placing at least one second multiplexer circuit in a different state and repeating the step of sending the second test pattern until a power level of the output signal generated by the multiple-stage multiplexer reaches the predetermined level.

12. The method of claim 9, wherein the step of placing comprises:
placing the one or more first multiplexer circuits in substantially random states.

13. The method of claim 9, wherein:
the steps of sending and placing are repeated until the power level of the output signal generated by the multiple-stage multiplexer falls reaches the predetermined level at a frequency corresponding to the input data rate of the first test pattern.

14. A method of synchronizing a multiple-stage multiplexer having a plurality of multiplexer circuits in a first stage thereof, comprising:
sending a test pattern through the multiple-stage multiplexer; and
upon a power level appearing at an output of the multiple-stage multiplexer failing to reach a predetermined level during the step of sending, changing the test pattern to a different test pattern and repeating the step of sending.

15. The method of claim 14, wherein bits of the test pattern sent through at least one multiplexer circuit are identical.

16. The method of claim 14, wherein the step of changing comprises shifting bits of the test pattern that are applied to a multiplexer circuit.

17. The method of claim 14, wherein the step of changing comprises delaying bits of the test pattern that are applied to at least one of the multiplexer circuits.

18. The method of claim 14, further comprising:
sending a second test pattern through the multiple-stage multiplexer; and
upon a power level appearing at the output of the multiple-stage multiplexer failing to reach a predetermined level during the step of sending the second test pattern, changing the test pattern to a different test pattern and repeating the step of sending the second test pattern.

19. An apparatus for synchronizing a multiple-stage multiplexer, comprising:
feedback circuitry having an input coupled to an output of the multiple-stage multiplexer and an output generating a feedback signal indicative of a power level of the output of the multiple-stage multiplexer at a predetermined frequency; and
a device for selectively applying a test pattern to the data inputs of the multiple-stage multiplexer and changing the test pattern until the feedback signal reaches a predetermined level.

20. The apparatus of claim 19, wherein:
the multiple-stage multiplexer comprises a plurality of multiplexer circuits in a first stage thereof and the device changes the delay of bits in the test pattern that are associated with a first multiplexer circuit, relative to the delay of bits in the test pattern that are associated with another multiplexer circuit.

21. The apparatus of claim 19, wherein:
the multiple-stage multiplexer comprises a plurality of multiplexer circuits in a first stage thereof, and the changing comprises shifting bits of the test pattern that are applied to a multiplexer circuit.

22. The apparatus of claim 19, wherein: the device comprises barrel shifter circuitry coupled to data inputs of the multiplexer circuits.

23. The apparatus of claim 19, wherein the device comprises:
a controller; and
a plurality of programmable delay elements coupled to data inputs of the multiple-stage multiplexer and controlled by the controller.

24. The apparatus of claim 19, wherein the device comprises:
a controller having software stored on an electronic medium therein, the software including instructions which, when executed by the controller, cause the device to change a timing parameter of bits of the test pattern.

25. The apparatus of claim 19, wherein the device comprises:
a controller having software stored on an electronic medium therein, the software including instructions which, when executed by the controller, cause the device to change an order of bits of the test pattern.

26. A test method for a multi-stage, serializer multiplexer, said method comprising:
applying a test pattern;
measuring at least one spectral component of an output of said multiplexer corresponding to a frequency harmonically related to an input data rate for said multiplexer; and
determining whether or not sub-multiplexers of said multiplexer are in synchronization relative to each other from the results of said measuring step.

27. The method of claim 26, further comprising:
upon sub-multiplexers of said multiplexer being determined to be out of synchronization relative to each other, changing the mapping between bits of said test pattern and data inputs of said multiplexer until said at least one spectral component of said output of said multiplexer indicates sub-multiplexers of said multiplexer are in synchronization relative to each other.

28. The method of claim 26, further comprising:
upon sub-multiplexers of said multiplexer being determined to be out of synchronization relative to each other, changing the timing of the bits of said test pattern applied to at least one sub-multiplexer until said at least one spectral component of said output of said multiplexer indicates sub-multiplexers of said multiplexer are in synchronization relative to each other.

29. The method of claim 26, further comprising:
upon sub-multiplexers of said multiplexer being determined to be out of synchronization relative to each other, changing a state of at least one sub-multiplexer until said at least one spectral component of said output of said multiplexer indicates sub-multiplexers of said multiplexer are in synchronization relative to each other.

30. The method of claim 26, wherein said test pattern is selected so that said spectral component of said output of said multiplexer is measurably different when said sub-multiplexers are in synchronization relative to each other as opposed to when said sub-multiplexer are out of synchronization relative to each other.

31. The method of claim 26, wherein said frequency at which said at least one spectral component is measured is an integer multiple of said input data rate.

32. The method of claim 26, wherein input data rate is an integer multiple of said frequency at which said at least one spectral component is measured.

33. The method of claim 26, wherein said measuring step comprises:
filtering, from said output of said multiplexer, harmonics of said input data rate to obtain a filtered signal; and
measuring the power level of said filtered signal.

34. A test apparatus for a multi-stage, serializer multiplexer, comprising:
a controller connected to data inputs of said multiplexer and adapted to apply a test pattern thereto; and
circuitry, connected to an output of said multiplexer, for measuring at least one spectral component of said output corresponding to a frequency harmonically related to an input data rate of said multiplexer, said controller being further adapted to determine whether or not sub-multiplexers of said multiplexer are in synchronization relative to each other based upon said spectral component measured.

35. The apparatus of claim 34, wherein:
upon sub-multiplexers of said multiplexer being determined by said controller to be out of synchronization relative to each other, said controller changes the mapping between bits of said test pattern to data inputs of said multiplexer until said at least one spectral component of said output of said multiplexer indicates sub-multiplexers of said multiplexer are in synchronization relative to each other.

36. The apparatus of claim 34, wherein:
upon sub-multiplexers of said multiplexer being determined by said controller to be out of synchronization relative to each other, said controller changes the timing of the bits of said test pattern applied to at least one sub-multiplexer until said at least one spectral component of said output of said multiplexer indicates sub-multiplexers of said multiplexer are in synchronization relative to each other.

37. The apparatus of claim 34, wherein:
upon sub-multiplexers of said multiplexer being determined by said controller to be out of synchronization relative to each other, said controller changes a state of at least one sub-multiplexer until said at least one spectral component of said output of said multiplexer indicates sub-multiplexers of said multiplexer are in synchronization relative to each other.

38. The apparatus of claim 34, wherein said test pattern is selected so that said spectral component of said output of said multiplexer is measurably different when said sub-multiplexers are in synchronization relative to each other as opposed to when said sub-multiplexer are out of synchronization relative to each other.

39. The apparatus of claim 34, wherein said frequency at which said at least one spectral component is measured is an integer multiple of said input data rate.

40. The apparatus of claim 34, wherein said test pattern is time varying so as to include some 50 percent duty-cycle sequences, said controller measures a half-input-rate spectral component at a frequency corresponding to half of said input data rate.

41. The apparatus of claim 40, wherein said controller determines whether or not said half-input-rate spectral component indicates multiplexer being in synchronization.

* * * * *